United States Patent
Smith et al.

(10) Patent No.: US 8,459,275 B2
(45) Date of Patent: Jun. 11, 2013

(54) IN-SITU CLEANING SYSTEM

(75) Inventors: Kim R. Smith, Woodbury, MN (US);
Keith E. Olson, Apple Valley, MN (US);
Erik C. Olson, Savage, MN (US);
Michael S. Rischmiller, Faribault, MN (US)

(73) Assignee: Ecolab USA Inc., Saint Paul, MN (US)

( * ) Notice: Subject to any disclaimer, the term of this patent is extended or adjusted under 35 U.S.C. 154(b) by 376 days.

(21) Appl. No.: 12/887,755

(22) Filed: Sep. 22, 2010

(65) Prior Publication Data
US 2011/0067732 A1 Mar. 24, 2011

Related U.S. Application Data

(60) Provisional application No. 61/245,060, filed on Sep. 23, 2009.

(51) Int. Cl.
*B08B 3/00* (2006.01)

(52) U.S. Cl.
USPC ........ 134/60; 134/95.1; 134/109; 15/104.001

(58) Field of Classification Search
None
See application file for complete search history.

(56) References Cited

U.S. PATENT DOCUMENTS

| | | | |
|---|---|---|---|
| 4,357,217 A | 11/1982 | Kuehn et al. | |
| 4,384,931 A | 5/1983 | Jasinski et al. | |
| 4,393,038 A | 7/1983 | Sun et al. | |
| 4,430,176 A | 2/1984 | Davison | |
| 4,455,203 A | 6/1984 | Stucki | |
| 4,533,443 A | 8/1985 | Wrighton et al. | |
| 4,572,774 A | 2/1986 | Wrighton et al. | |
| 4,576,756 A | 3/1986 | Wrighton et al. | |
| 4,753,718 A | 6/1988 | Chiang | |
| 4,758,317 A | 7/1988 | Chiang | |
| 5,074,975 A | 12/1991 | Oloman et al. | |
| 5,112,702 A | 5/1992 | Berzins et al. | |
| 5,246,551 A | 9/1993 | Pletcher et al. | |
| 5,358,609 A | 10/1994 | Drackett | |
| 5,565,073 A | 10/1996 | Fraser et al. | |
| 5,645,700 A | 7/1997 | White et al. | |
| 5,702,585 A | 12/1997 | Hillrichs et al. | |
| 5,882,501 A | 3/1999 | Foller et al. | |
| 5,900,133 A | 5/1999 | Foller et al. | |
| 5,904,829 A | 5/1999 | Foller et al. | |
| 5,906,722 A | 5/1999 | Foller et al. | |
| 6,045,684 A | 4/2000 | Wakita et al. | |
| 6,159,349 A | 12/2000 | Wakita et al. | |
| 6,254,762 B1 | 7/2001 | Uno et al. | |

(Continued)

FOREIGN PATENT DOCUMENTS

| JP | 05092198 A | * | 4/1993 |
|---|---|---|---|
| JP | 06091295 A | * | 4/1994 |

OTHER PUBLICATIONS

International Search Report, PCT/IB2010/054284, mailed Jul. 29, 2011.

*Primary Examiner* — Eric Golightly
(74) *Attorney, Agent, or Firm* — McKee, Voorhees & Sease, P.L.C.

(57) ABSTRACT

The in situ cleaning system provides an inlet capable of providing feed water to an in situ cleaning component, one or more in situ cleaning components, including water treatment components, an oxidizing agent generating component and/or alkalinity generating component, and an outlet in fluid communication with a washing system, providing a cleaning use solution to the washing system.

20 Claims, 9 Drawing Sheets

U.S. PATENT DOCUMENTS

| | | |
|---|---|---|
| 6,274,114 B1 | 8/2001 | Ledon et al. |
| 6,375,824 B1 | 4/2002 | Phinney |
| 6,375,920 B2 | 4/2002 | Fischer et al. |
| 6,569,309 B2 | 5/2003 | Otsuka et al. |
| 6,592,840 B1 | 7/2003 | Fischer et al. |
| 6,685,818 B2 | 2/2004 | Lehmann et al. |
| 6,692,716 B1 | 2/2004 | Phinney |
| 6,695,963 B2 | 2/2004 | Otsuka et al. |
| 6,712,949 B2 | 3/2004 | Gopal |
| 6,761,815 B2 | 7/2004 | Nakajima et al. |
| 6,767,447 B2 | 7/2004 | Uno et al. |
| 6,773,575 B2 | 8/2004 | Nakajima et al. |
| 6,913,844 B2 | 7/2005 | Butcher et al. |
| 2003/0111424 A1 | 6/2003 | Rosen et al. |
| 2003/0132167 A1 | 7/2003 | Haase |
| 2004/0168975 A1 | 9/2004 | Pulles et al. |

* cited by examiner

IN-SITU CLEANING SYSTEM

CROSS-REFERENCE TO RELATED APPLICATIONS

This application is a nonprovisional application of U.S. Provisional Application No. 61/245,060, filed Sep. 23, 2009, which is herein incorporated by reference in its entirety.

FIELD OF THE INVENTION

The present invention relates to systems and methods for providing an in situ cleaning system. In particular, the invention provides a use solution from in situ cleaning components, including one or more of a water treatment component, an oxidizing agent generating component, and an alkalinity generating component, replacing the need for a detergent containing alkalinity, builders, polymers and chlorine bleach with in situ generation of a cleaning use solution.

BACKGROUND OF THE INVENTION

Traditional detergents often contain numerous chemicals in order to improve cleaning activity. For example, detersive cleaning agents often contain builders, sequestrants, chelating agents, surfactants, alkalinity sources and a variety of additional chemicals in order to tailor a detergent for a particular cleaning activity. However, many consumers prefer to use household cleaning agents with minimal chemicals and non-hazardous materials. Exemplary natural or homemade "detergent-free" cleaners often include baking soda and baking powder. The use of fewer chemicals is favored by many consumers due to a variety of benefits, such as minimizing health risks, lower costs and "going green".

Among the various chemical additives often required for detergents are components to counteract the effects of water hardness. Hard water is known to reduce the efficacy of detergents. One method for counteracting this includes adding chelating agents or sequestrants into detersive compositions that are intended to be mixed with hard water in an amount sufficient to handle the hardness. However, in many instances the water hardness exceeds the chelating capacity of the composition. As a result, free calcium ions may be available to attack active components of the composition, to cause corrosion or precipitation, or to cause other deleterious effects, such as poor cleaning effectiveness or lime scale build up. Further, some chelators and sequestrants (e.g., phosphates and NTA) have been found to cause environmental and health issues.

Another method for addressing water hardness issues currently used is to soften water via ion exchange, e.g., by exchanging the calcium and magnesium ions in the water with sodium associated with a resin bed in a water softening unit. The calcium and magnesium adhere to a resin in the softener. When the resin becomes saturated it is necessary to regenerate it using large amounts of sodium chloride dissolved in water. The sodium displaces the calcium and magnesium, which is flushed out in a briny solution along with the chloride from the added sodium chloride. When water softeners regenerate they produce a waste stream that contains significant amounts of chloride, creating a burden on the system, e.g., sewer system, in which they are disposed of, including a multitude of downstream water re-use applications like potable water usages and agriculture. Further, traditional water softeners add to the salt content in discharge surface waters, which has become an environmental issue in certain locations.

Other components which improve the cleaning function of detergents include alkalinity sources. Alkaline cleaning compositions are known to be effective in various applications. For example, alkaline cleaners are effective as grill and oven cleaners, ware wash detergents, laundry detergents, laundry presoaks, drain cleaners, hard surface cleaners, surgical instrument cleaners, transportation vehicle cleaning, dish wash presoaks, dish wash detergents, beverage machine cleaners, concrete cleaners, building exterior cleaners, metal cleaners, floor finish strippers, degreasers and burned-on soil removers. For some applications, cleaning agents having a very high alkalinity are most desirable. For example, floor stripping compositions for removal of floor finishes are highly alkaline.

In many applications, these highly alkaline cleaning compositions must be transported, handled and applied by workers. However, such agents can be dangerous and can cause burns to exposed skin, particularly in the concentrated form. As the alkalinity of the compositions increases, the possible risk to workers also increases. Great care must therefore be taken to protect workers who handle concentrated highly alkaline materials.

Accordingly, an embodiment of the invention is to provide in situ cleaning systems requiring no more than household cleaning agents having a full range of detersive cleaning effects.

An additional embodiment of the invention is to provide an in situ cleaning system and methods for producing cleaning use solutions that are efficient and sustainable.

A further embodiment of the invention is to provide in situ cleaning systems for on-site generation of cleaning agents without requiring expensive or dangerous transportation.

These and other embodiments of the invention are set forth herein the description of the invention.

BRIEF SUMMARY OF THE INVENTION

According to the invention, in situ cleaning systems and methods of cleaning are disclosed. The systems may comprise, consist of, or consist essentially of: (a) an inlet capable of providing feed water to an in situ cleaning component; (b) one or more in situ cleaning components; and (c) an outlet in fluid communication with a washing system. In some embodiments, the in situ cleaning component may comprise, consist of, or consist essentially of one or more of: a water treatment component; an oxidizing agent generating component; and/or an alkalinity generating component.

In some embodiments, the one or more in situ cleaning components are provided in series. In other embodiments, the one or more in situ cleaning components are provided in parallel. In additional embodiments of the invention, the one or more in situ cleaning components are provided in a single housing. In other embodiments, the one or more in situ cleaning components are provided in a plurality of housings. In still other embodiments, the cleaning system may be positioned either external to the washing system or positioned internally to the washing system.

In some embodiments the water treatment component may comprise, consist of or consist essentially of a threshold agent, catalyst, conversion agent, filtration systems, and/or alkaline sources. Preferred embodiments of the invention employing water treatment components do not require softening water. In still further embodiments, the oxidizing agent generating component may comprise, consist of or consist essentially an electrolytic system, such as electrochemical unit, capable of generating an oxidizing agent. In further embodiments, the alkalinity generating component may comprise, consist of or consist essentially of an electrochemical alkalinity generator and decomposition agents Additional embodiments of the invention provide methods for cleaning using the in situ cleaning system. The methods may comprise, consist of, or consist essentially of: (a) providing feed water to an in situ cleaning system, wherein the cleaning system provides a use solution; and (b) contacting an article with the use solution, such that the article is cleaned. In some embodiments, the cleaning system may comprise, consist of, or consist essentially of one or more of: (i) a water treatment component; (ii) an oxidizing agent generating component; and (iii) an alkalinity generating component; wherein the cleaning system provides a use solution.

DETAILED DESCRIPTION OF THE PREFERRED EMBODIMENT

Figure 1:
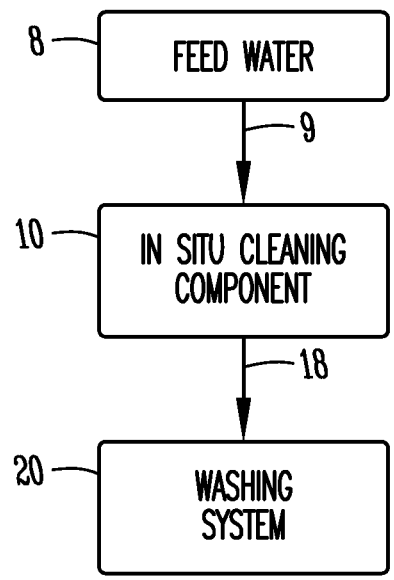
FIGS. 1-6 are schematic diagrams of non-limiting embodiments of the in situ cleaning systems according to the invention.

The present disclosure relates to methods, systems, and apparatuses for cleaning using an in situ cleaning system. In some aspects, the in situ cleaning system of the present invention includes one or more in situ cleaning components. In situ cleaning components for use in the present invention include, but are not limited to, a water treatment component, an oxidizing agent generating component and an alkalinity generating component. After water passes through the one or more in situ cleaning components a cleaning use solution is generated. The use solution will have varying properties dependent upon which in situ cleaning components are included in a particular system. For example, a system including a water treatment component and an alkalinity generating component produce a resulting alkaline use solution having reduced solubilized water hardness. In this manner, the methods, systems, and apparatuses of the present invention allow for effective cleaning compositions using reduced amounts of chemical ingredients that are customarily included in conventional detergents and cleaning compounds (e.g., builders, sources of alkalinity).

The present invention of methods, systems, and apparatuses for cleaning using an in situ cleaning system further obviates the need for transportation of highly alkaline cleaning agents. The in situ generation of a cleaning use solution according to the invention allows for onsite production and use of cleaning agents. The invention further provides environmentally friendly systems and methods for cleaning agents comprising, consisting of or consisting essentially of non-hazardous feedstock materials, such as table salt, baking soda and baking powder. Therefore, the methods, systems, and apparatuses for in situ cleaning system meet consumers' requests for "green" cleaning solutions and eliminates the need to purchase bulk chemicals due to the systems' ability to generate the requisite cleaning agents.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. All units, prefixes, and symbols may be denoted in its SI accepted form. Numeric ranges recited within the specification are inclusive of the numbers defining the range and include each integer within the defined range. In describing and claiming the embodiments of the present invention, the following terminology will be used in accordance with the definitions set out below so that the invention may be more readily understood.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

As used herein, the term "about" refers to variation in the numerical quantity that can occur, for example, through typical measuring and liquid handling procedures, through inadvertent error in these procedures, through differences in the manufacture, source, or purity of the ingredients used to make the compositions or carry out the methods and the like. The term "about" also encompasses amounts that differ due to different equilibrium conditions for a composition resulting from a particular initial mixture. Whether or not modified by the term "about", the claims include equivalents to the quantities.

As used herein, the terms "builder," "chelating agent," and "sequestrant" refer to a compound that forms a complex (soluble or not) with water hardness ions (from the wash water, soil and substrates being washed) in a specific molar ratio. Chelating agents that can form a water soluble complex include sodium tripolyphosphate, EDTA, DTPA, NTA, citrate, and the like. Sequestrants that can form an insoluble complex include sodium triphosphate, zeolite A, and the like. As used herein, the terms "builder," "chelating agent "and" sequestrant" are synonymous.

As used herein, the term "free of chelating agent" or "substantially free of chelating agent" refers to a composition, mixture, or ingredients that does not contain a chelating agent or sequestrant or to which only a limited amount of a chelating agent, builder, or sequestrant has been added. Should a chelating agent, builder, or sequestrant be present, the amount of a chelating agent, builder, or sequestrant shall be less than about 7 wt-%. In some embodiments, such an amount of a chelating agent, builder, or sequestrant is less than about 2 wt-%, less then about 0.5 wt-%, or less than about 0.1 wt-%.

As used herein, the term "lacking an effective amount of chelating agent" refers to a composition, mixture, or ingredients that contains too little chelating agent, builder, or sequestrant to measurably affect the hardness of water.

As used herein, the term "cleaning" means to perform or aid in soil removal, bleaching, microbial population reduction, or combinations thereof.

As used herein, the term "conversion agent" refers to a species that causes solubilized calcium in water to substantially precipitate from solution as calcium carbonate in a form which is thought to be the thermodynamically unfavorable crystal form aragonite rather than as the thermodynamically favorable crystal form calcite. Aragonite is a fragile crystal which doesn't bind well to surfaces and doesn't form hard water scale while calcite is a more robust crystal which binds tightly to surfaces, forming a hard water scale that's not seen with aragonite.

As used herein, the term "decomposition agent," refers to a compound, compounds or compositions capable of degrading or decomposing a peroxygen source into a source of alkalinity. The combined effect of decomposition and generation of alkalinity are necessary for a decomposition agent according to the invention. This is distinct from the recognized use of certain transition metals to decompose hydrogen peroxide for improved bleaching activity. This is also distinct from the recognized use of certain transition metals to decompose hydrogen peroxide without the formation of alkalinity.

As used herein, the term "feed water," refers to any source of water that can be used with the methods, systems and apparatus of the present invention. Exemplary water sources suitable for use in the present invention include, but are not limited to, water from a municipal water source, or private water system, e.g., a public water supply or a well. The water can be city water, well water, water supplied by a municipal water system, water supplied by a private water system, and/or water directly from the system or well. The feed water can also include water from a used water reservoir, such as a recycle reservoir used for storage of recycled water, a storage tank, or any combination thereof. In some embodiments, the water source is from the sump of a mechanical washing device such as a dishwasher. In some embodiments, the water source is from a dispenser for a solid block of feedstock. In some embodiments, the water source is not an industrial process water, e.g., water produced from a bitumen recovery operation. In other embodiments, the water source is not a waste water stream.

As used herein, the term "hard surface" includes showers, sinks, toilets, bathtubs, countertops, windows, mirrors, transportation vehicles, floors, and the like.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.,), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheel chairs, beds, etc.,), or surgical and diagnostic equipment. Health care surfaces include articles and surfaces employed in animal health care.

As used herein, the term "instrument" refers to the various medical or dental instruments or devices that can benefit from cleaning using water treated according to the methods of the present invention. As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning using water treated according to the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the term "laundry," refers to woven and non-woven fabrics, and textiles. For example, laundry can include, but is not limited to, clothing, bedding, towels and the like.

As used herein, the term "phosphate-free" or "substantially phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than about 1.0 wt-%. In some embodiments, the amount of phosphate is less than about 0.5 wt-%. In other embodiments, the amount of phosphate is less then about 0.1 wt-%. In still yet other embodiments, the amount of phosphate is less than about 0.01 wt-%.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than about 1.0 wt-%. In some embodiments, the amount of phosphorous is less than about 0.5 wt-%. In other embodiments, the amount of phosphorus is less than about 0.1 wt-%. In still yet other embodiments, the amount of phosphorus is less than about 0.01 wt-%.

As used herein, the term "solubilized water hardness" refers to hardness minerals dissolved in ionic form in an aqueous system or source, i.e., $Ca^{++}$ and $Mg^{++}$. Solubilized water hardness does not refer to hardness ions when they are in a precipitated state, i.e., when the solubility limit of the various compounds of calcium and magnesium in water is exceeded and those compounds precipitate as various salts such as, for example, calcium carbonate and magnesium carbonate.

As used herein, the term "threshold agent" refers to a compound that inhibits crystallization of water hardness ions from solution, but that need not form a specific complex with the water hardness ion. Threshold agents are capable of maintaining hardness ions in solution beyond its normal precipitation concentration. See e.g., U.S. Pat. No. 5,547,612. Threshold agents may include, for example and without limitation, polycarboxylates, such as polyacrylates, polymethacrylates, olefin/maleic copolymers, olefin/acrylate copolymers and the like. The threshold agent according to the invention must survive an electrochemical cell's conditions to ensure it is not deactivated and prevented from inhibiting scaling, and further must not cause any decrease in chlorine generation. In one embodiment, the threshold agent protects the cathode of the electrochemical cell from being occluded by hard water scale. According to the invention, the threshold agent is preferably characterized as substoichiometric, such that the threshold agent is effective at concentration levels that are lower than would be expected based on a stoichiometric equivalence of the threshold agent and the scale-causing component present in the electrochemical cell or treated water source.

As used herein, the term "free of threshold agent" or "substantially free of threshold agent" refers to a composition, mixture, or ingredient that does not contain a threshold agent or to which only a limited amount of a threshold agent has been added. Should a threshold agent be present, the amount of a threshold agent shall be less than about 7 wt-%. In some embodiments, such an amount of a threshold agent is less than about 2 wt-%. In other embodiments, such an amount of a threshold agent is less then about 0.5 wt-%. In still yet other embodiments, such an amount of a threshold agent is less than about 0.1 wt-%.

As used herein, the term "ware" refers to items such as eating and cooking utensils and other hard surfaces such as showers, sinks, toilets, bathtubs, countertops, windows, minors, transportation vehicles, and floors. As used herein, the term "warewashing" refers to washing, cleaning, or rinsing ware.

As used herein, the term "water soluble" refers to a compound that can be dissolved in water at a concentration of more than 1 wt-%.

As used herein, the term "water insoluble" refers to a compound that can be dissolved in water only to a concentration of less than 0.1 wt-%. For example, magnesium oxide is considered to be insoluble as it has a water solubility (wt-%) of about 0.00062 in cold water, and about 0.00860 in hot water. Other insoluble compounds for use with the methods of the present invention include, for example: magnesium hydroxide with a water solubility of 0.00090 in cold water and 0.00400 in hot water; aragonite with a water solubility of 0.00153 in cold water and 0.00190 in hot water; and calcite with a water solubility of 0.00140 in cold water and 0.00180 in hot water.

As used herein, the terms "slightly soluble" or "slightly water soluble" refer to a compound that can be dissolved in water only to a concentration of 0.1 to 1.0 wt-%.

As used herein, "weight percent," "wt-%," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, apparatuses, and compositions of the present invention can include, consist essentially of, or consist of the component and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Systems of the Invention

The present invention provides in situ cleaning systems. FIGS. 1-6 show schematic diagrams of embodiments of the in situ cleaning systems according to the invention. One skilled in the art will recognize that additional combinations and arrangements of the in situ cleaning systems are encompassed by the invention and are not exclusively represented in the figures provided herein. For example, the in situ cleaning systems according to the invention are capable of generating cleaning use solutions for a variety of applications due to user-controlled adjustments to the in situ cleaning system for different cleaning applications and/or conditions. For example, according to an embodiment of the invention a water treatment component of the in situ cleaning component is modified to treat unsoftened feed water having variable hardness levels. According to a further embodiment, a particular intended use of a cleaning use solution from the in situ cleaning system may require increased oxidizing and/or alkalinity to clean a particular surface, ware and/or instrument. These embodiments and others are incorporated within the scope of the various embodiments of the in situ cleaning system according to the invention.

FIG. 1 shows an embodiment of the cleaning system according to the invention wherein the system comprises, consists of, or consists essentially of an inlet 9 capable of providing feed water 8 in fluid communication to at least one in situ cleaning component 10 that is in fluid communication with an outlet 18 that is in further fluid communication with a washing system 20. According to the invention, the washing system 20 can include, but is not limited to, any washing zone, such as a warewashing system, a laundry washing system, a vehicle washing system, a healthcare washing system, an instrument washing system, a clean-in-place washing system, such as a food processing plant washing system, bottle washing system and combinations thereof.

Figure 2:
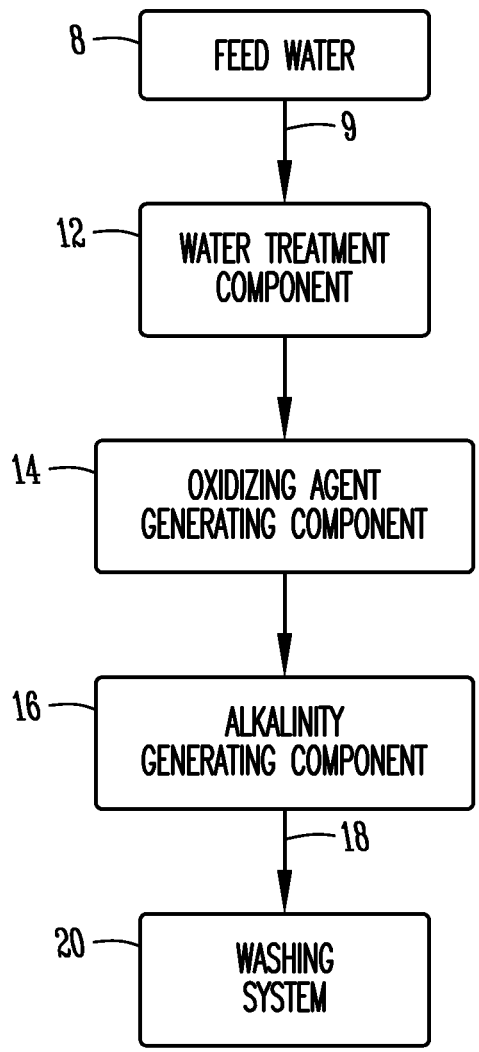
Figure 3:
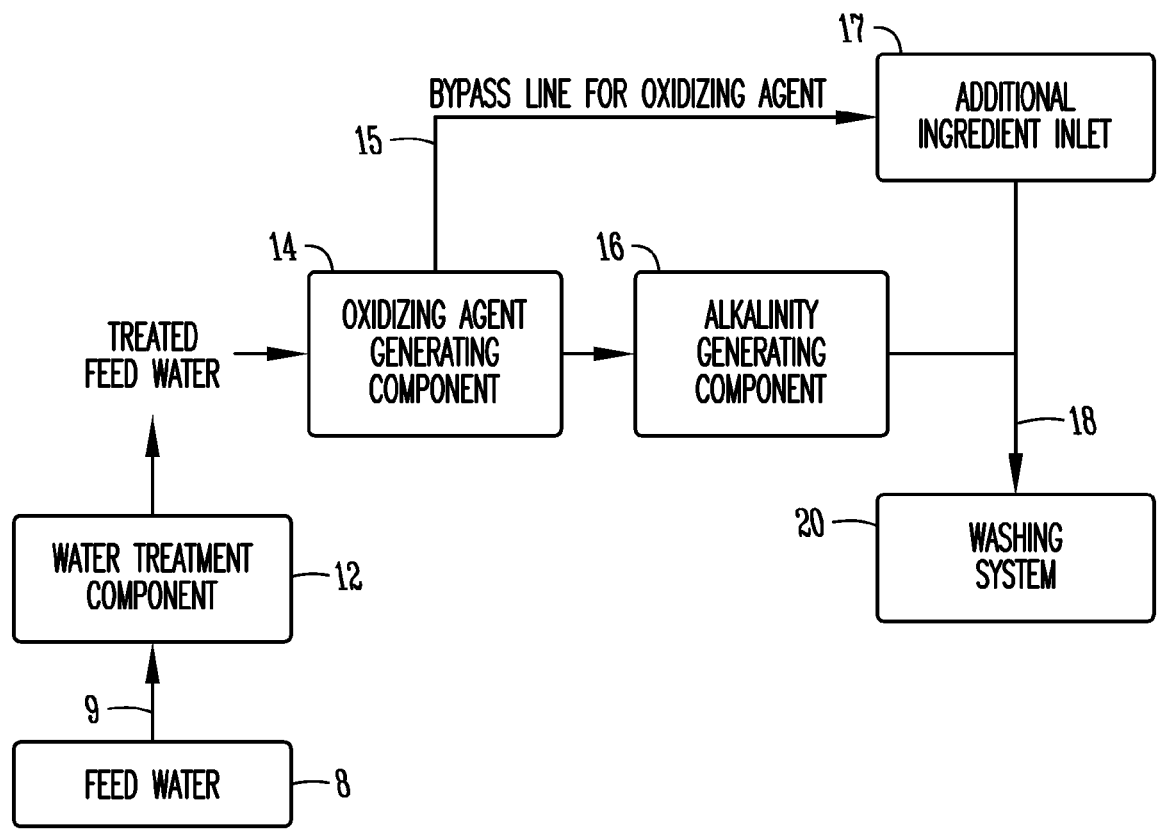
Figure 4:
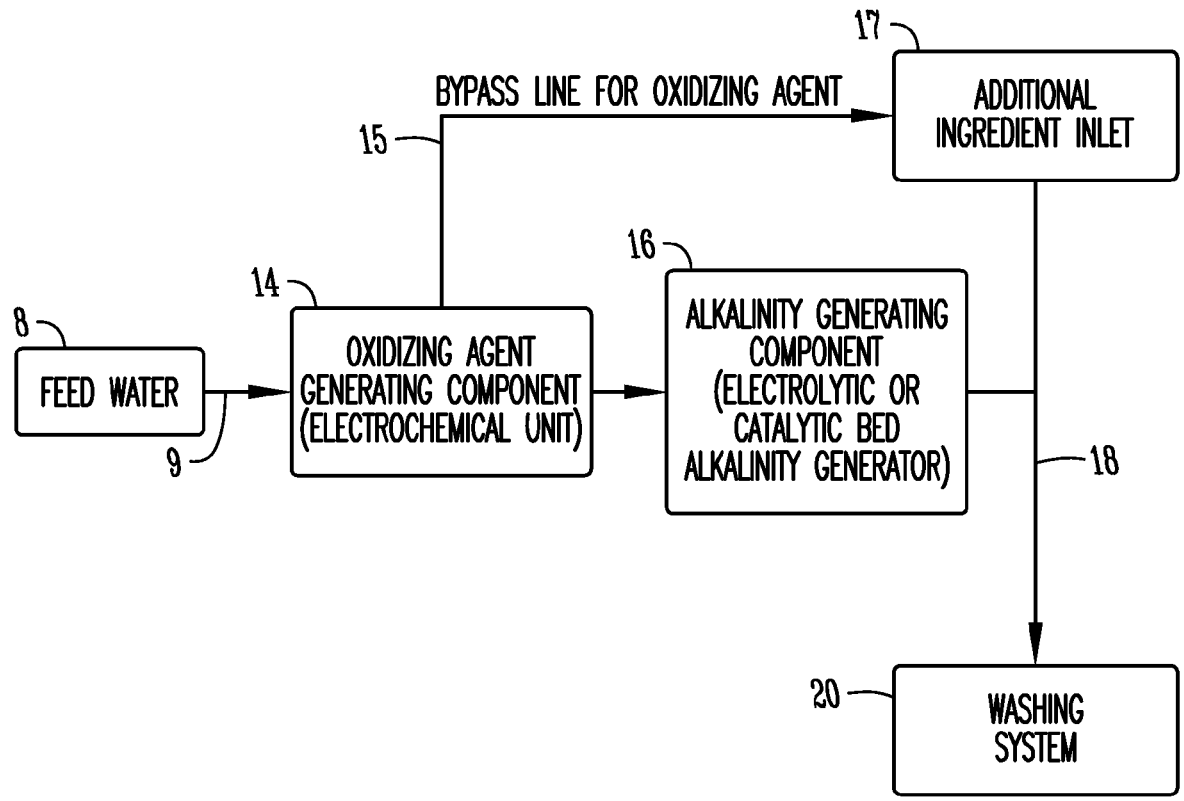
Figure 5:
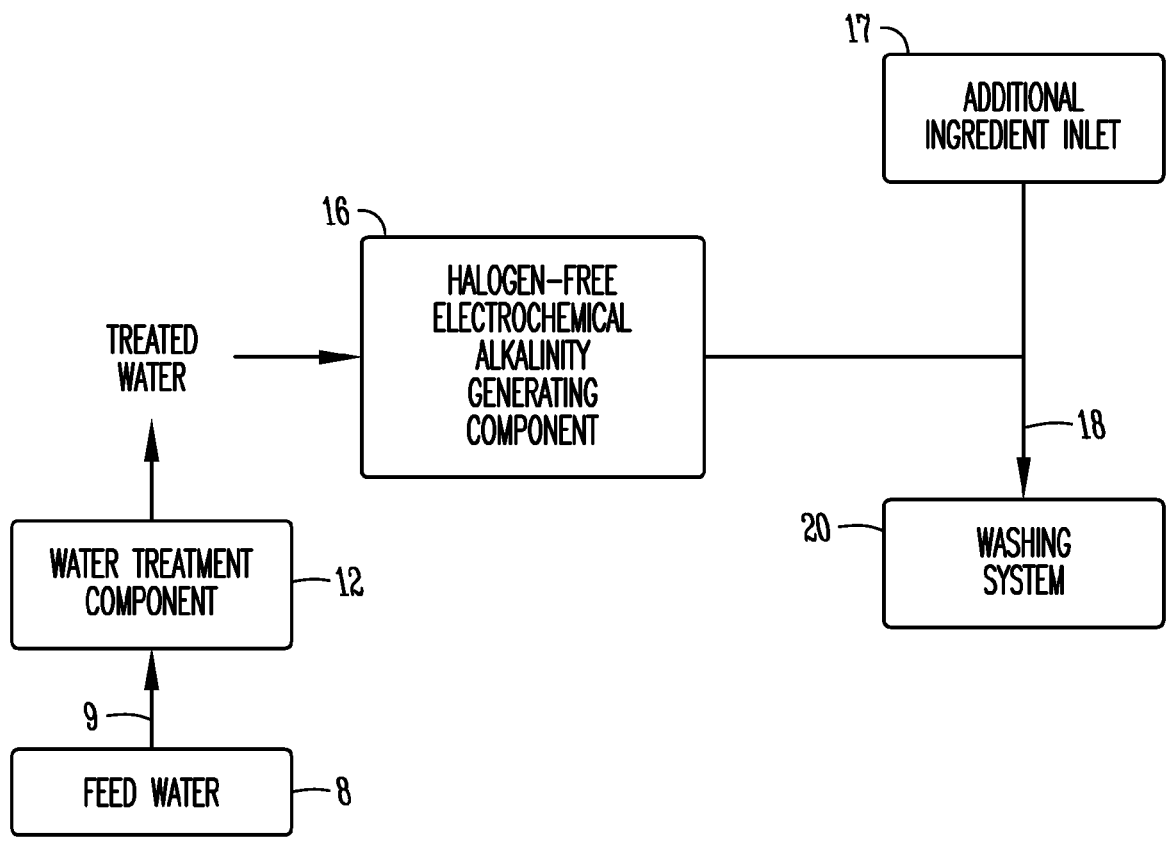
Figure 6:
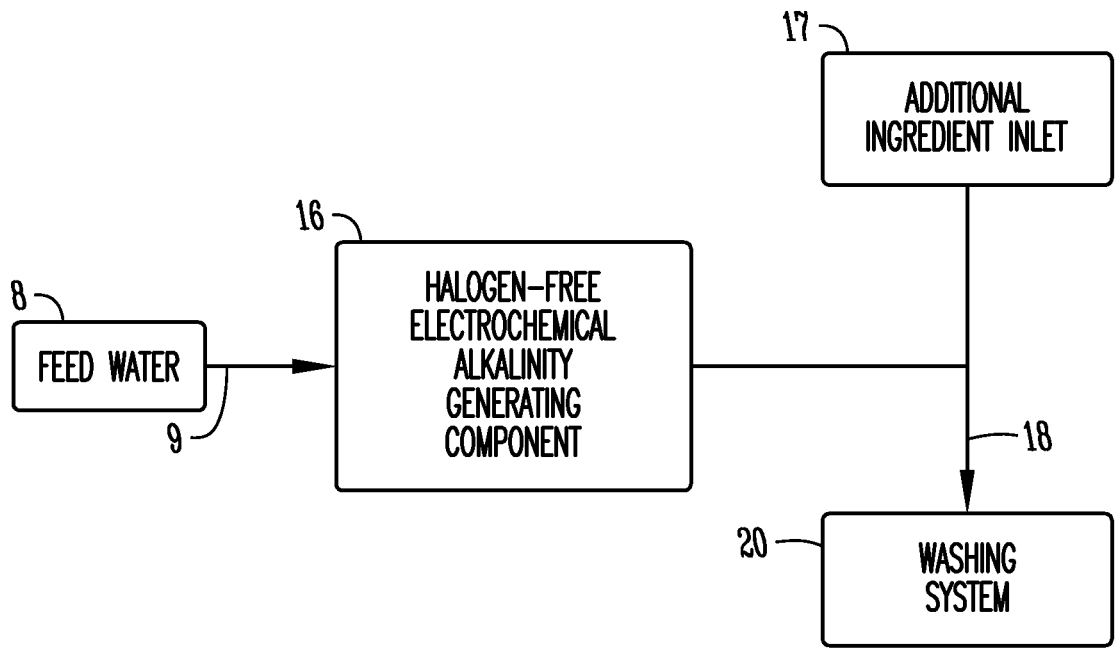

FIG. 2 shows a further embodiment of the invention and identifies suitable in situ cleaning components 10 according to the invention, including one or more of: a water treatment component 12, an oxidizing agent generating component 14, an alkalinity generating component 16 and combinations thereof. For example, FIG. 2 shows an embodiment of the invention including each of a water treatment component 12, an oxidizing agent generating component 14, and an alkalinity generating component 16 that are in fluid communication with an outlet 18 to a washing system 20. According to alternative embodiments, demonstrated in FIGS. 3-6, an additional ingredient inlet 17 may be in fluid communication with the in situ cleaning system outlet 18 and/or the washing system 20, providing additional ingredients that may be beneficial for the particular washing system and desired cleaning purpose of the embodiment.

In a still further embodiment of the invention, an optional bypass line 15 may be incorporated in the in situ cleaning system to supply oxidizing agents generated from the oxidizing agent generating component 14 to the additional ingredient inlet 17 and/or the cleaning system outlet 18. Preferably, the bypass line 15 is fluidly connected between the oxidizing agent generating component 14 and the outlet to the washing system 20. In other embodiments, the bypass line 15 is fluidly connected between the at least one in situ component 10 and the additional ingredient inlet 17 fluidly connected to the outlet 18 to the washing system.

The bypass line can be used, for example, in situations in which the oxidizing agent generating component generates a halogen bleach. According to a further embodiment, the bypass line 15 is used in a system comprising an alkalinity generating component having a decomposition agent, whereby the oxidizing agent would be partially or completely exhausted as a result of its decomposition into a source of alkalinity. These and other embodiments are described further herein.

The in situ cleaning system according to the invention may be presented in various alternative embodiments, wherein a single apparatus or housing can include variations of the in situ cleaning components 10. For example, according to an embodiment, the alkalinity generating component 16 can be provided separately or not at all in an in situ cleaning system. According to a further embodiment, the in situ cleaning system can include a water treatment component 12 and an oxidizing agent generating component 14. In still other embodiments, the system can include a water treatment component 12 and an alkalinity generating component 16. In still further embodiments, the system may include an alkalinity generating component 16 and an oxidizing agent generating component 14.

It is to be understood according to the invention that the in situ cleaning components 10 can be positioned either internally or externally to the washing system 20 and can be provided in a single housing, or in a plurality of housings. For example, two in situ cleaning components can be provided in two housings, or in a single housing. In embodiments in which one or more cleaning components are provided in more than one housing, some of the components can be provided internally to the washing system, and some can be provided externally to the washing system. The cleaning components can also be provided in parallel or in serial as will be ascertained by a person of skill in the art based on the disclosure of the invention contained herein.

Water Treatment Component

In some embodiments of the invention, the in situ cleaning system includes a water treatment component 12. A water treatment component is provided to the system, for example, to reduce the amount of solubilized hardness in a water source. Without being limited to a particular theory, the water treatment component reduces solubilized hardness in water, thereby reducing the amount of or eliminating the need for chelating agents, sequestering agents, conventional builders, chelating agent, threshold agents and/or phosphorous needed in a detergent or cleaning agent supplied to a washing system 20 according to the invention. As a result, use of a water treatment component in the in situ cleaning systems according to the invention minimizes the amount of chemicals added to the resulting cleaning agent compared to non-treated water sources and increases the efficacy of the cleaning agent. In addition, use of a water treatment component according to the invention reduces the amount of hard water deposits, scales, and build up occurring on surfaces contacted by the feed water 8, providing an additional benefit of reducing the need to clean the in situ cleaning system itself.

Suitable water treatment components for use in the methods and systems according to the invention may include for example, threshold agent systems, catalytic systems, conversion agent systems, resin materials, filtration systems, and/or alkaline sources, as are each described further in this application. Preferred embodiments of the invention employing water treatment components do not require softening water. According to an embodiment, water treatment components according to the invention reduce a source of solubilized water hardness in the feed water. Preferred embodiments provide unsoftened water for use in the in situ cleaning systems of the invention. Preferred embodiments of the invention include the use of an unsoftened water source that is subsequently treated by one or more of the following water treatment components as described according to the invention.

Threshold Agents

According to an embodiment of the invention, the water treatment component may include a threshold agent to inhibit the crystallization and precipitation of water hardness without actually softening the water. In addition, a threshold agent utilized according to the invention prevents scaling of electrodes and membranes in an electrochemical cell, namely the cathode of a cell that may be utilized as a cleaning component in the in situ cleaning system. Exemplary threshold agents for use as a water treatment component are described in U.S. Provisional Patent Application Ser. No. 61/293,968 filed on Jan. 11, 2010, entitled "Control of Hard Water Scaling in Electrochemical Cells", the entire content of which is hereby incorporated by reference.

According to preferred embodiments, the threshold agents are water soluble polymeric systems capable of preventing hard water scale formation. According to the invention, the threshold agents are compatible for inhibiting scaling caused by hard water deposits, particularly in systems supplied with water having high levels of carbonate, hydroxide and/or phosphate ions along with water hardness ions traditionally leading to buildup causing unsightly residue, film and scaling. According to an embodiment of the invention where an in situ cleaning system comprises an electrochemical cell, water impurities such as calcium and magnesium are not deleterious to the electrolytic water once threshold agents are utilized to prevent crystallization and scaling with bicarbonate, carbonate, hydroxide, sulfate and/or phosphate ions. Accordingly, use of a threshold agent as a water treatment component obviates the need to "soften" a water source.

Suitable threshold agents for use as a water treatment component include polycarboxylates or related copolymers. A variety of such polycarboxylate polymers and copolymers are known and described in patent and other literature, and are available commercially. Exemplary polycarboxylates that may be utilized as threshold agents according to the invention include for example: homopolymers and copolymers of polyacrylates; polymethacrylates; polymalates; materials such as polyolefinic and polymaleic copolymers, such as olefinic and maleic hydride copolymers and also olefinic and acrylate copolymers and derivatives and salts of all of the same. In one embodiment, the threshold agent is a polymer with a natural backbone such as a cellulosic, polysaccharide-based, or alginic-based polymer and copolymer and derivatives and salts of all of the same. Although not intending to be limited according to a particular theory, the threshold agents suitable for use according to the present invention are preferably short chain polymers with low molecular weights that do not cause decreased chlorine production or increased voltage demand as a result of a large molecular weight and long chain interfering with electrical flow in an electrochemical cell. According to an embodiment of the invention, suitable threshold agents have a molecular weight less than 10,000, preferably less than 5000, more preferably less than 4000, and according to a most preferred embodiment less than 2000.

According to preferred embodiments, the threshold agent for use as a water treatment component in the in situ cleaning system of the present invention is selected from the following commercially-available agents: Acusol 445N, Acusol 588, Acusol 455, Acusol 420NG, Acusol 445ND, Acusol 445NG, Acusol 460NK, Acusol 497NG, Acusol 2100, Acusol 3100 (all available from Rohm & Haas), Briquest 301-50A, Briquest ADPA-60A, Briquest 422-25S, Briquest 422-34CS, Briquest 301-50A, Briquest 543-45AS, Briquest 543-25S, Briquest ADPA-20AS, Briquest ADPA-21SH, Briquest 221-50A, Briquest 301-50A, Briquest 5123-50A (all available from Rhodia) and Aquatreat AR 260 (available from Alco Chemical). The threshold agents can be provided at a concentration up to about 10,000 ppm to achieve a desired level of scale inhibition. According to preferred embodiments, the threshold agent can be provided at a concentration up to about 1,000 ppm, from about 50 to about 500 ppm, and preferably about 100 ppm.

According to the invention, the threshold agent may be formulated into a variety of composition formulations, such as for example a solid or a flowable liquid. In one embodiment, the threshold agent is added in the form of a liquid. In another embodiment, the threshold agent is in the form of a solid block which is then dispensed into a stream of water using a variety of solids dispensing systems known to the art. In an additional embodiment, the threshold agent is combined with the chemical feed for the electrochemical cell (for example, sodium chloride, sodium bicarbonate, sodium carbonate). In another embodiment, the source of the threshold agent is from a weak cation exchange resin which has had its cation exchange capability exhausted by exposure to a source of calcium or magnesium or mixtures thereof. Exemplary exhausted weak cation exchange resins which can serve as a source of threshold agent to control water hardness are described in U.S. patent application Ser. No. 12/764,621 filed on Apr. 21, 2010, entitled "Methods and Apparatus for Controlling Water Hardness", the entire content of which is hereby incorporated by reference.

Catalytic Systems

According to additional embodiments of the invention, the water treatment component can include a catalytic system. Exemplary water treatment components including catalytic agents, systems and methods of using the same to reduce solubilized water hardness are described in U.S. patent application Ser. No. 12/764,606 filed on Apr. 21, 2010, entitled "Catalytic Water Treatment Method and Apparatus", the entire content of which is hereby incorporated by reference.

An embodiment of a catalytic system for use as a water treatment component according to the invention includes a treatment reservoir including one or more catalysts positioned therein. In some embodiments, the catalyst includes a water treatment agent bound to a supporting material, wherein the water treatment agent is selected from the group consisting of a source of magnesium, zinc, titanium and iron ions and combinations of the same. Optionally, the catalyst may include a source of aluminum. Optionally, the catalyst may be zinc-free.

Any material capable of supporting the water treatment agent can be used in the catalyst system for the water treatment component. Supporting material may be provided in any shape and size, including, beads, sheets, rods, disks or combinations of more than one shape. In addition, the catalyst may be bound to the support material in a variety of ways. For example, in some embodiments, the supporting material comprises a resin which may include, but is not limited to, a weak acid cation resin (e.g., an acrylic acid polymer, a methacrylic acid polymer, and mixtures thereof), a polymer having sulfonic acid substituents, a carboxylic acid polymer, and mixtures thereof. The catalyst can be ionically bound to the support medium in some embodiments, as well as combined with unbound additional ingredients. Additional function ingredients may be combined with the catalysts for use in the water treatment component, in any form, including for example metal oxides, metal hydroxides, polymorphs of calcium carbonate (non-calcite forms) and combinations and mixtures thereof.

While not intending to be bound by theory, it is believed that the catalyst act as nucleation seeds to precipitate calcium carbonate out of the water in the form of aragonite. As such, the catalyst does not undergo an ionic exchange which would require recharging of the resin with additional catalyst, as in existing water treatment systems. Rather, the catalyst continues to promote the precipitation of calcium carbonate over an extended period of time without needing to be replaced. According to an embodiment, ongoing experimentation has shown catalysts according to the invention continue to function after processing over 25,000 gallons of water per pound of resin without fail or requiring replacement.

Figure 7:
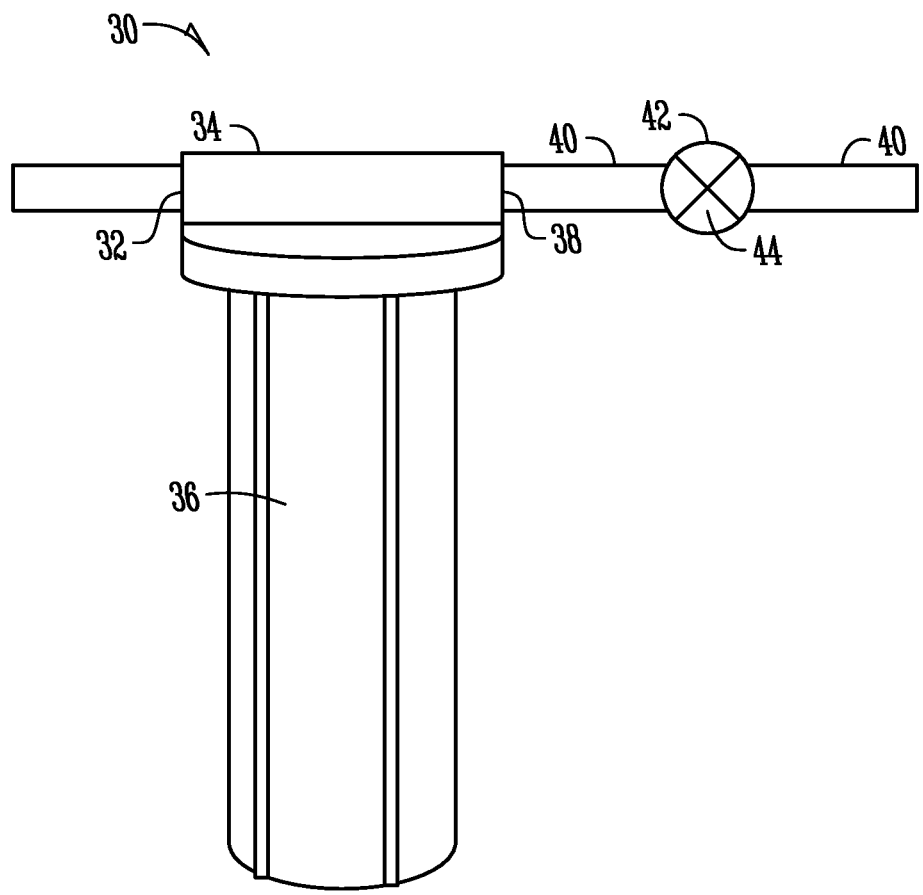
FIG. 7 is a schematic view of an apparatus for use as a water treatment component according to a non-limiting embodiment of the in situ cleaning system.

The catalyst system for use with as a water treatment component according to an embodiment of the invention can be contained in a treatment reservoir. The reservoir may be any shape or size appropriate for the use of the water and the volume of water to be treated, including for example, a tank, a cartridge, a filter bed of various physical shapes or sizes, or a column. In some embodiments, the treatment reservoir may be pressurized or non-pressurized. An example of a water treatment component 30 for use with a catalytic system is shown in FIG. 7. The apparatus of a water treatment component may include: an inlet 32 for providing the water source to a treatment reservoir 34; a treatment reservoir 34 including a water treatment agent 36 (such as a catalyst); an outlet 38 for providing treated water from the treatment reservoir; and a treated water delivery line 40. In some embodiments, the treated water delivery line 40 provides water to a selected washing system 20. In other embodiments, the treated water delivery line 40 provides water to an additional in situ cleaning component 10. In some embodiments, there is no filter between the outlet and the treated water delivery line. A flow control device 42 such as a valve 44 can be provided in the treated water delivery line 40 to control the flow of the treated water into the selected end use device, e.g., an additional in situ cleaning component, or a washing system.

Conversion Agents

According to additional embodiments of the invention, the water treatment component can include a treatment reservoir including one or more conversion agents. Without wishing to be bound by any particular theory, it is thought that the conversion agents for use with the methods of the present invention cause solubilized calcium water hardness ions in water to substantially precipitate in a non-calcite crystalline form via an interfacial reaction that produces the thermodynamically unfavorable crystal form aragonite, rather than as the thermodynamically favorable crystal form calcite. Thus, contacting feed water with a conversion agent according to an embodiment of the invention reduces the solubilized water hardness of the treated water, and leads to a reduction in scale formation on a surface in contact with the treated water. The aragonite crystals can also act as seed crystals for further reduction of solubilized calcium after contacting the conversion agent.

Exemplary water treatment components including conversion agents, such as water soluble magnesium compounds, and methods of using the same are described in U.S. patent application Ser. No. 12/114,448, entitled "Water Treatment System and Downstream Cleaning Methods" and U.S. patent application Ser. No. 12/114,513, entitled "Cleaning Compositions Containing Water Soluble Magnesium Compound and Method of Using Them", the entire contents of which are hereby incorporated by reference.

In some embodiments, the conversion agent may be a solid particle. Conversion agents suitable for use with the present invention include, but are not limited to metal oxides, metal hydroxides, polymorphs of calcium carbonate and combinations and mixtures thereof. In some embodiments, the conversion agent includes a metal oxide. Metal oxides suitable for use in the present invention include, but are not limited to, magnesium oxide, aluminum oxide, titanium oxide, and combinations and mixtures thereof. Optionally, the conversion agent is free of aluminum. Optionally, the conversion agent is free of zinc. Metal hydroxides suitable for use with the present invention include, but are not limited to, magnesium hydroxide, aluminum hydroxide, titanium hydroxide, and combinations and mixtures thereof. Polymorphs of calcium carbonate suitable for use as a conversion agent include, but are not limited to, aragonite. In some embodiments, magnesium oxide, magnesium hydroxide, or a combination of magnesium oxide and hydroxide are used as a conversion agent to treat water. The conversion agent may be in any form, e.g., solid, particle, liquid, powder, nanoparticle, slurry, suitable for use with the methods and in situ cleaning systems of the present invention.

Certain embodiments of the invention use a magnesium source for the water treatment component. The composition can include magnesium ion at predefined ratios to calcium ion in water, such as magnesium ion in a molar amount equal to or in excess over a molar amount of calcium ion. It is preferred the water soluble magnesium salt can include an anion that, together with calcium ion, forms a water soluble calcium salt. For example, the present invention may include a soluble magnesium source provided to the feed water. According to an embodiment of the invention, use of a water soluble magnesium (a hardness ion ($Mg^{2+}$)) as a water treatment component works at least as well as a conventional chelating agent or sequestrant (i.e. sodium tripolyphosphate (STPP)) at preventing precipitation of calcium salts while actually increasing the overall water hardness.

Suitable water soluble magnesium compounds include those selected from the group consisting of magnesium acetate, magnesium benzoate, magnesium bromide, magnesium bromate, magnesium chlorate, magnesium chloride, magnesium chromate, magnesium citrate, magnesium formate, magnesium hexafluorosilicate, magnesium iodate, magnesium iodide, magnesium lactate, magnesium molybdate, magnesium nitrate, magnesium perchlorate, magnesium phosphinate, magnesium salicylate, magnesium sulfate, magnesium sulfite, magnesium tartrate, magnesium thiosulfate, a hydrate thereof, and a mixture thereof. These salts can be provided as hydrated salts or anhydrous salts. Water soluble magnesium compounds approved as GRAS for direct food contact, including for example, magnesium chloride and magnesium sulfate, can also be used.

The water treatment component including a conversion agent can further include additional functional ingredients. Additional functional ingredients suitable for use include any materials that impart beneficial properties to the conversion agent, the water source being treated, or any combination thereof. For example, in some embodiments the conversion agent includes a solid media bed of particles, e.g., magnesium oxide particles. Additional functional ingredients may be added that aid in the prevention of "cementing" of the media bed, i.e., agglomeration of the particles, as it is contacted with a water source. In still further embodiments, the additional functional ingredient includes a polymorph of calcium carbonate. Exemplary polymorphs of calcium carbonate include, but are not limited to, aragonite, calcite, vaterite and mixtures thereof. In other embodiments, the additional functional ingredient includes a mixed cation compound of calcium and magnesium ions. In some embodiments, the additional functional material includes calcium magnesium carbonate, some natural minerals of which may also be known by the name dolomite.

The conversion agent for use with the water treatment component according to the invention can be contained in a treatment reservoir in the water treatment component. The reservoir can be for example, a tank, a cartridge (such as a portable removable cartridge), a filter bed of various physical shapes or sizes, or a column. In some embodiments, the treatment reservoir including a conversion agent is resin-free, viz., it does not contain a material that contains univalent hydrogen, sodium or potassium ions, which exchange with divalent calcium and magnesium ions in the water source. The reservoir can be pressurized or not pressurized. One reservoir or multiple reservoirs can be used. For example, the water source can be passed over a plurality of reservoirs, in the same or in separate containers, comprising the same or different conversion agents. The reservoirs may also be arranged in series or in parallel.

In some embodiments, the conversion agent is in the form of an agitated bed or column. The bed or column can be agitated to avoid "cementing," i.e., agglomeration of the solid conversion agent once contacted with the water source. The bed or column can be agitated by any known method including, for example, by the flow of water through the column, fluidization, mechanical agitation, high flow backwash, recirculation, and combinations thereof. In some embodiments, the solid conversion agent includes a fluidized bed, e.g., a column or a cartridge, in the treatment reservoir. Fluidization is obtained by an increase in the velocity of the fluid, e.g., water, passing through the bed such that it is in excess of the minimum fluidization velocity of the media. In still further embodiments, the treatment reservoir comprises a portable, removable cartridge.

Resin Materials

In additional embodiments of the invention, the water treatment component may include a resin material to control water hardness without substantially altering the water source. A variety of resin materials may be used with the in situ cleaning systems of the present invention and embodiments are described in U.S. patent application Ser. No. 12/764,621 filed on Apr. 21, 2010 entitled "Methods and Apparatus for Controlling Water Hardness", the entire content of which is hereby incorporated by reference.

Figure 9:
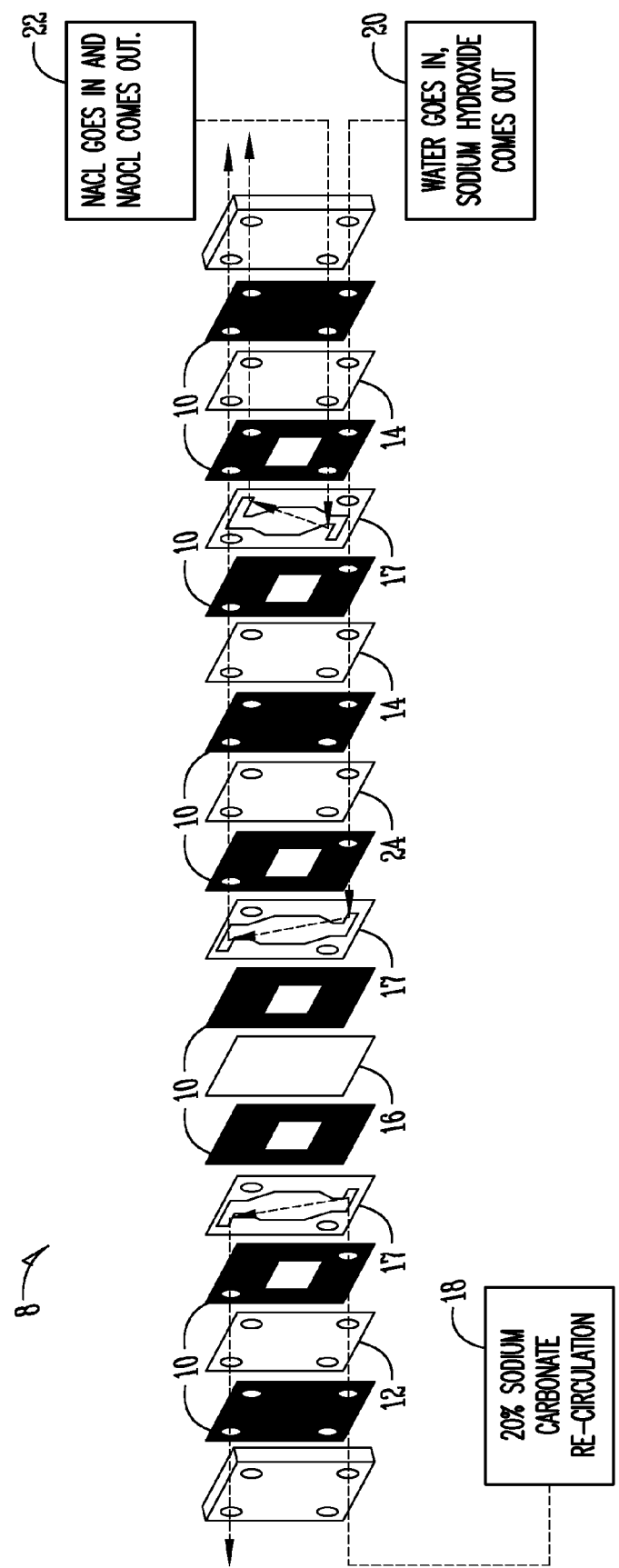
FIG. 9 is a further schematic diagram of a water treatment component for independent production of streams of sodium hypochlorite and sodium hydroxide using separate electrodes according to a non-limiting embodiment of the in situ cleaning system.

Various embodiments of the resin material may be incorporated into the water treatment component of the in situ cleaning system, including for example, exhausted resin materials, a resin substantially loaded with a plurality of one or more multivalent cations, substantially water insoluble resin material and acid cation exchange resin. An example of a water treatment component for use with a resin material is shown in FIG. 9.

In some embodiments, the resin material is an exhausted resin material. As used herein, the term "exhausted resin material" refers to an ion exchange resin material that can control water hardness, but that is incapable of performing an ion exchange function. In some embodiments, an exhausted resin material has a surface that is substantially loaded with a plurality of one or more multivalent cations, and is thus unable to exchange ions with a water source when contacted with a water source. The exhausted resin materials of the present invention do not control water hardness through an ion exchange mechanism. That is, the surface of an exhausted resin material is inert, as it is loaded with a plurality of multivalent cations.

In additional embodiments, the resin is substantially loaded with a plurality of one or more multivalent cations, which may include a mixture of calcium and magnesium ions. The calcium and magnesium ions may be loaded on to the resin material at a ratio of from about 1:10 to about 10:1, about 1:5 to about 5:1, about 1:3 to about 3:1, about 1:2 to about 2:1, or from about 1:1 of calcium ions to magnesium ions. In still further embodiments, a substantially water insoluble resin material is loaded with a plurality of cations.

Additional embodiments of the resin materials for the water treatment component include an acid cation exchange resin that may include a weak acid cation exchange resin, a strong acid cation exchange resin, and combinations thereof. Weak acid cation exchange resins suitable for use in the present invention include, but are not limited to, a cross linked acrylic acid polymer, a cross linked methacrylic acid polymer, and mixtures thereof. In some embodiments, resin polymers have additional copolymers added. The copolymers include but are not limited to butadiene, ethylene, propylene, acrylonitrile, styrene, vinylidene chloride, vinyl chloride, and derivatives and mixtures thereof.

The resin material for use in the invention may be provided in any shape and size, including beads, rods, disks or combinations of more than one shape. In some embodiments, the resin material is selected from the group consisting of a gel type resin structure, a macroporous type resin structure, and combinations thereof. In some embodiments, the resin material may have a particle size of from about 0.5 mm to about 1.6 mm and to as large as 5.0 mm. The resin material may also include a mixture of particle sizes, viz. a mixture of large and small particles. It is also to be understood that the resin material is contained within a treatment reservoir in some embodiments, wherein any reservoir capable of holding the water treatment composition may be used as a treatment reservoir.

Filtration Systems

According to additional embodiments of the invention, the water treatment component may include filtration systems. Any suitable filtration systems can be used in the in situ cleaning system for water treatment according to the invention. Filtration systems, including for example, ionic filtration systems, may be used to remove precipitates from feed water.

Alkalinity Sources

In additional embodiments of the invention, the water treatment component may include an alkaline source to increase the pH of the water source. According to an embodiment of the invention, an alkalinity source preferably increases the pH of the water source to approximately 9.

According to the various embodiments of the invention, as described herein, use of the water treatment components according to the various embodiments of the invention substantially reduces solubilized hardness of the unsoftened feed water provided to the in situ cleaning system of the invention. The particular amount of water hardness reduction achieved is dependent on a variety of factors, including, but not limited to the pH of the water source, the temperature of the water source, the initial water hardness and the water treatment components utilized in a particular in situ cleaning system. In some embodiments of the invention, the solubilized water hardness may be reduced by about 25%, by about 50%, by about 75% and most preferably by about 90% when water treatment components are incorporated into the in situ cleaning system of the invention. In some embodiments of the invention, the solubilized water hardness may be increased by the addition of a source of magnesium.

Oxidizing Agent Generating Component

According to an embodiment of the invention, the in situ cleaning system may include an oxidizing agent generating component for use in producing in situ chemical for the cleaning system. Suitable oxidizing agent generating components according to the invention may include an electrolytic system, such as electrochemical unit, capable of generating an oxidizing agent. Suitable oxidizing agents according to the invention include hydrogen peroxide, ozone, a peracid, a halogen bleach, and mixtures thereof. The in situ generation of the oxidizing agent according to the invention provides significant advantages over the use of commercially-available bleach or peroxide products. For example, the oxidizing agents according to the invention are phosphate-free and do not require the addition of any builders. These advantages and others will be appreciated by one of skill in art based on the disclosure of the in situ cleaning system provided herein.

Electrolytic Systems

In some embodiments, the oxidizing agent generating component includes an electrolytic system, such as a device capable of producing an oxidizing agent, e.g., hydrogen peroxide, halogen bleaches, ozone, peracids. In some embodiments, the oxidizing agent generating component includes an electrochemical unit capable of producing the desired oxidizing agent. Exemplary electrochemical units for use in the present invention include, but are not limited to those described U.S. Pat. Nos. 6,773,575, 6,767,447, 6,761,815, 6,712,949, for example. Each of these patents is hereby incorporated by reference herein in its entirety. However, the oxidizing agent generating composition according to the invention is not limited according to the structure of the electrochemical unit.

It is a further embodiment of the invention that the electrochemical unit provides a source of alkalinity or acidity in addition to the oxidizing agent. The electrolysis of a salt source and/or water to generate an oxidizing agent, such as chlorine (or "hypochlorous acid," "hypochlorite," etc. as may be commonly interchanged), is well established. A basic solution of sodium hydroxide (or "caustic" or "alkali") as well as an acidic solution of hypochlorous acid is formed. One skilled in the art understands the relationship between the structure of an electrochemical unit and the various effluents produced. For example, a unit divided by a membrane produces both hypochlorous acid and sodium hydroxide. Alternatively, an electrochemical cell not divided by a membrane produces hypochlorite (sodium hypochlorite, commonly referred to as bleach) and alkalinity in the form of hydroxide anions. The structure of the electrochemical unit may be adapted based upon the desired pH of the oxidizing agent according to the invention. As it is appreciated that oxidizing agents, such as peroxide, are more stable at a lower pH and provide improved cleaning, sanitizing, disinfecting and/or antimicrobial efficacy at an increased pH, the pH of the oxidizing agent according to the invention may be adjusted according to a particular use of the cleaning agent produced by the in situ cleaning system.

According to the use of the electrolytic system for the oxidizing agent generating component of the in situ cleaning system, the oxidizing products obtained from electrolytic process provide a source of chlorine-based or peroxygen-based material having numerous cleaning, sanitizing and/or antimicrobial capabilities. For example, the oxidizing agents are biocidal agents effective in killing bacteria, viruses, parasites, protozoa, molds, spores and other pathogens and are suitable for use according to the invention in a variety of washing systems. In addition, the oxidizing agents produced according to the invention are preferably phosphate-free.

Alkalinity Generating Component

According to an embodiment of the invention, the in situ cleaning system may include an alkalinity generating component for use in producing in situ chemicals for detersive purposes according to the invention. In some embodiments, the in alkalinity generating component includes any device or component capable of producing a source of alkalinity or resulting in an increase in the pH of the treated solution. For example, suitable alkalinity generating components may include an electrochemical alkalinity generator and decomposition agents.

Electrolytic Alkalinity Systems

According to an embodiment of the invention, the alkalinity generating component may comprise, consist of or consist essentially of an electrochemical unit capable of producing a source of alkalinity. In one embodiment, the alkalinity generating component includes an electrochemical unit capable of producing a source of alkalinity, e.g., potassium hydroxide and/or potassium sulfate, via electrolyzing sodium sulfate. In a further embodiment, an electrochemical unit used as an alkalinity generating component comprises an inlet in fluid communication with the electrochemical cell, wherein the inlet provides a source of carbonate, bicarbonate, percarbonate or mixtures thereof to the electrochemical cell.

An exemplary component is described in U.S. Pat. No. 6,375,824, the entire contents of which are hereby incorporated herein by reference in its entirety. Additional exemplary methods and devices for the electrochemical production of alkalinity sources are described in U.S. Pat. Nos. 6,913,844; 6,695,963; 6,692,716; 6,569,309; 5,906,722; 5,904,829; 5,900,133; 5,882,501; and 5,246,551. The entire contents of each of these patents are hereby incorporated herein by reference in its entirety.

According to a further embodiment, the alkalinity generating component according to the invention may include an inlet in fluid communication with the electrochemical unit to provide a source of alkali metal carbonate, bicarbonate, alkali metal hydroxide and mixtures thereof to the electrochemical unit. In certain embodiments, one skilled in the art will ascertain from the disclosure of the present invention, that the alkalinity generating component may be a single component with the oxidizing agent generating component, whereby an alkalinity source and an oxidizing agent are generated simultaneously. However, according to yet another embodiment, the electrochemical unit does not produce a source of chlorine or an oxidizing agent.

In some embodiments, the oxidizing agent generating component and the alkalinity generating component are in series. In other embodiments, the oxidizing agent generating component and the alkalinity generating component are in parallel.

Decomposition Agents

In some embodiments, the alkalinity generating component according to the invention is a decomposition agent capable of catalyzing the decomposition of an oxidizing agent to form a source of alkalinity. Suitable decomposition agents and systems for alkalinity generating components according to the invention are further described U.S. patent application Ser. No. 12/780,407 and Ser. No. 12/780,453 entitled "Compositions, Systems and Method for In Situ Generation of Alkalinity," and Ser. No. 12/780,503 entitled "Peroxygen Catalyst-Containing Fabric and Use for In Situ Generation of Alkalinity," each filed on filed May 14, 2010, the entire contents of which are hereby incorporated by reference.

Without wishing to be bound by any particular theory of the invention, the decomposition agent catalyzes the decomposition of the peroxygen source, generating alkalinity. The decomposition agent may further facilitate the decomposition of the peroxygen source, preferably a dilute peroxygen source. Still further, the decomposition agent causes bubbling useful for improved cleaning, such as removal of soil from hard surfaces. Production of alkalinity in situ allows for the use of cleaning compositions, such as cleaning concentrates, having decreased levels of alkalinity in applications which require higher levels of alkalinity as the decomposition agent and the peroxygen source can be brought into contact, generating alkalinity at the desired time of use.

The decomposition agent according to the invention may include various substances as well as the use of one or more decomposition agents for a cleaning composition. The decomposition agent according to the invention is not consumed by the reaction with the peroxygen source. Accordingly, it is an embodiment of the invention that the decomposition agent does not need to be replaced and is be reusable in combination with various support media. In some embodiments, the decomposition agent may have activity as a bleach activator in the presence of a bleachable substrate and as a decomposition agent for the increase of alkalinity from the decomposition of a peroxygen source in the absence of a bleachable substrate. In further embodiments, the decomposition agent of the reduced alkalinity cleaning composition is metallic. Examples of decomposition agents include various forms of metallic manganese, silver, and vanadium.

According to preferred embodiments the decomposition agent includes at least one source of manganese. In some embodiments, the manganese source is derived from manganese metal, manganese oxides, colloidal manganese, inorganic or organic complexes of manganese, including manganese sulfate, manganese carbonate, manganese acetate, manganese lactate, manganese nitrate, manganese gluconate, manganese chloride or commercially available as Dragon A350 (also known as Dragon's Blood, available from Rahu Catalystics of Nottingham, U.K.), or any of the salts of salt forming species with manganese.

According to a further preferred embodiment, the decomposition agent includes at least one source of silver. In some embodiments, the silver source is derived from silver metal, silver oxides, silver hydroxide, colloidal silver, inorganic or organic complexes of silver, water-soluble or insoluble silver salts, including silver sulfate, silver carbonate, silver acetate, silver lactate, silver nitrate, silver gluconate, or silver chloride, or any of the salts of or salt forming species with silver. According to a still further embodiment, the decomposition agent includes at least one source of vanadium.

According to the invention, the decomposition agent is substantially free of iron, which may slow down the rate or counteract the activity of the decomposition agent according to the invention. In some embodiments, the decomposition agents may be soluble in water, slightly soluble in water, form a suspension in water or insoluble in water. According to further embodiments, the decomposition agent is provided in its solid, naturally occurring form. For example, the metallic silver decomposition agent according to an embodiment of the invention may be provided as a solid piece of silver. In other embodiments, the decomposition agent can be deposited onto or into a catalyst support matrix.

According to the invention, increasing the concentration of the decomposition agent results in a faster rate of pH increase. In some embodiments of the invention, the decomposition agent has a concentration in a cleaning composition without a support medium from about 0.5 ppm to about 10 wt-%. In some embodiments, the decomposition agents are present at about 1 ppm to about 5 wt-%, or from about 50 ppm to about 2 wt-%. In further embodiments of the invention, the decomposition agent has a concentration in a cleaning composition when present on a support medium from about 1 wt-% to about 100 wt-%. In some embodiments, the decomposition agents are present at about 5 wt-% to about 50 wt-%, and in other embodiments at about 10 wt-% to about 30 wt-%. It is to be understood that all values and ranges between these values and ranges are encompassed by the invention. According to a further embodiment, one or more promoters may be used in combination with a decomposition agent. Decomposition promoters suitable for use with the present invention include, but are not limited to, a magnesium ion source, a copper ion source, a zinc ion source, and mixtures thereof.

In some embodiments, the decomposition agent is provided on a support medium. Any support medium, i.e., substrate, which is compatible with the selected decomposition agent can be used. For example, the support medium can include, but is not limited to, a fabric, a pad, a sponge, an inorganic particle, a foam, and combinations thereof. The support medium can be any water insoluble inert support such as a support bed, for example. For example, the support bed can include a source of captive, water insoluble alkalinity. Additional examples of the support medium can include, but are not limited to, magnesium oxide, magnesium hydroxide, zinc oxide, titanium oxide, aluminum oxide, silicon oxide, alumino-silicate, ceramic, or polymeric material. The decomposition agent can be adhered to the support medium by any means known in the art. For example, the decomposition agent can be adhered to the support medium by physical absorption or by ionic exchange. According to other embodiments, the decomposition agent is bound to or adhered to a fabric. Examples of fabric which can be used include sponges, non woven materials, woven materials, cotton or other natural sources, polyester, polyamide, polyolefin, extruded films and laminates. The decomposition agent can be adhered to the fabric by any means known in the art.

Other suitable support media include particles that have been loaded with the decomposition agent. Exemplary particles include, but are not limited to, carbon, ion exchange resin, silicates, sand, aluminum oxide, metal oxides, and/or combinations thereof. Metal oxides suitable for use in the methods of the present invention include zinc oxide, magnesium oxide, titanium oxide, and combinations thereof. In some embodiments, the support medium is substantially free of aluminum oxide. In some embodiments, the decomposition agent may be provided in a cartridge or a column in the alkalinity generating component. The cartridge includes one or more inlets and one or more outlets and contains the decomposition agent. The cartridge can also include the support medium to which the decomposition agent can be bound. The decomposition agent can also be loose within the cartridge. In some embodiments, the cartridge contains fibers which include the decomposition agent, such as loose fibers of silver.

In some embodiments, the oxidizing agent is provided to the alkalinity generating component through an inlet in fluid communication with the alkalinity generating component for use of a decomposition agent according to the invention.

Additional Ingredients

Embodiments of the invention may further include an additional ingredient inlet in fluid communication with the in situ cleaning system, such as the outlet. The additional ingredient inlet is capable of providing additional ingredients to the washing system. Any ingredient which would be useful for a particular washing system may be used in embodiments of the invention. The additional ingredient used in embodiments of the invention may be a liquid or a solid. For example, the additional ingredient can include, but is not limited to, one or more of the following: inorganic additives; alkalinity sources; builders, e.g., chelating/sequestering agents; threshold agents, organic additives; surfactants; rinse aids; bleaching agents (oxy- or active halogen); bleach catalysts; sanitizers/antimicrobial agents; activators; defoaming agents; solidification agents; anti-redeposition agents; optical brighteners; dyes; odorants; hardening agents; solubility modifiers; corrosion inhibitors; magnesium sources or resins (water soluble or insoluble); enzymes and combinations thereof, as well as a variety of other materials, depending upon the desired characteristics and/or functionality of the cleaning agent for use in the washing system according to the invention.

In preferred embodiments of the invention, the additional ingredient consists essentially of a surfactant. In an additional embodiment, the additional ingredient consists essentially of an enzyme. In other embodiments, the additional ingredient is substantially free of a source of alkalinity. In still yet other embodiments, the additional ingredient is substantially free of a builder. In another embodiment, no additional ingredient is added.

According to an embodiment of the invention, the additional ingredient for use with the in situ cleaning system can include effective amounts of one or more initiating alkalinity sources to, for example, initiate or accelerate the decomposition of an oxidizing agent or to enhance cleaning of a substrate and improve soil removal performance of the system. In some embodiments, a metal carbonate such as sodium or potassium carbonate, bicarbonate, sesquicarbonate, mixtures thereof and the like can be used. Examples of useful alkaline sources include a metal silicate such as sodium or potassium silicate (for example, with a M2O:SiO2 ratio of about 1:2.4 to about 5:1, M representing an alkali metal) or metasilicate; a metal borate such as sodium or potassium borate, and the like; ethanolamines and amines; and other like alkaline sources. Exemplary alkalinity sources suitable for use with the methods of the present invention include, but are not limited to, sodium hydroxide, potassium hydroxide, lithium hydroxide, triethanolamine, diethanolamine, monoethanol amine, sodium metasilicate, potassium metasilicate, sodium orthosilicate, potassium orthosilicate, and combinations thereof.

According to a further embodiment of the invention, the additional ingredient for use with the in situ cleaning system can included a surfactant, including for example, anionic, nonionic, cationic, and zwitterionic surfactants, which are commercially available from a number of sources. Exemplary suitable surfactants include nonionic surfactants, including low foaming non-ionic surfactants. For a discussion of surfactants, see Kirk Othmer, Encyclopedia of Chemical Technology, Third Edition, volume 8, pages 900-912. Additional surfactants that may suitable for use according to the in situ cleaning system of the present invention are disclosed in U.S. patent application Ser. No. 12/262,935 entitled "Enhanced Stability Peracid Compositions", filed on filed Oct. 31, 2008, the entire contents of which is hereby incorporated by reference.

In additional embodiments of the invention, the additional ingredient can include a builder. Builders include chelating agents (chelators), sequestering agents (sequestrants), detergent builders, and the like. Examples of builders include, but are not limited to, phosphonates, phosphates, aminocarboxylates and their derivatives, pyrophosphates, polyphosphates, ethylenediamene and ethylenetriamene derivatives, hydroxyacids, and mono-, di-, and tri-carboxylates and their corresponding acids. Other exemplary builders include aluminosilicates, nitroloacetates and their derivatives, and mixtures thereof. Still other exemplary builders include aminocarboxylates, including salts of ethylenediaminetetraacetic acid (EDTA), hydroxyethylenediaminetetraacetic acid (HEDTA), and diethylenetriaminepentaacetic acid. Builders can be water soluble, and/or biodegradable. Other exemplary builders include EDTA (including tetra sodium EDTA), TKPP (tetrapotassium pyrophosphate), PAA (polyacrylic acid) and its salts, phosphonobutane carboxylic acid, and sodium gluconate. In some embodiments, the selected builder is substantially free of phosphorus. In some embodiments, such as embodiments which include a water treatment component, the cleaning agent has reduced builder or is substantially free of a builder.

According to further embodiments of the invention, a bleaching agent is an additional ingredient for use with the in situ cleaning system. Bleaching agents can be used for lightening or whitening a substrate, and include bleaching compounds capable of liberating an active halogen species, such as $Cl_2$, $Br_2$, $I_2$, $ClO_2$, $BrO_2$, $IO_2$, $OCl^-$, $—OBr^-$ and/or, $—OI^-$, under conditions typically encountered during the cleansing process. Bleaching agents for use in the present invention include, for example, chlorine-containing compounds such as a chlorite, a hypochlorite, chloramine. Halogen-releasing compounds including, for example, the alkali metal dichloroisocyanurates, chlorinated trisodium phosphate, the alkali metal hypochlorites, alkali metal chlorites, monochloramine and dichloramine, and the like, and mixtures thereof can be included. Encapsulated chlorine sources can also be used to enhance the stability of the chlorine source in the composition (see, for example, U.S. Pat. Nos. 4,618,914 and 4,830,773, the disclosure of which is incorporated by reference herein in its entirety). A bleaching agent can also be an additional oxidizing agent such as hydrogen peroxide, peracids, perborates, for example sodium perborate mono and tetrahydrate, sodium carbonate peroxyhydrate, phosphate peroxyhydrates, and potassium permonosulfate, with and without activators such as tetraacetylethylene diamine, and the like. In some embodiments, such as embodiments which include an oxidizing agent generating component, the cleaning agent has reduced or no bleaching agent or peroxygen source.

Methods of Use

Methods of use for the in situ cleaning system according to the invention include obtaining a use solution from the in situ cleaning system. In some embodiments, the use solution comprises at least one of a source of oxidizing agent, a source of alkalinity, water having a reduced solubilized hardness level, and combinations thereof. A use solution from the in situ cleaning system is provided to at least one washing system where an article or articles to be cleaned are contacted with the use solution, such that the article(s) is cleaned. In some embodiments, the method further comprises rinsing the article. The article can be rinsed with treated water, treated softened water, or with untreated water. A rinse aid can also be applied to the article after it has been washed.

Any automatic or manual washing system that would benefit from the use of the in situ cleaning solution in accordance with the methods of the present invention can be used. These include a variety of industrial (commercial) and domestic (residential) applications. For example, a method, system, or apparatus of the present invention can be used in: warewashing applications, e.g., washing eating, instruments and cooking utensils and other hard surfaces such as showers, sinks, toilets, bathtubs, countertops, windows, mirrors, and floors; in laundry applications, e.g., automatic textile washing machines; in vehicle care applications; industrial applications; in food service and food processing applications; in clean-in-place applications; and in healthcare instrument care applications.

In some embodiments, the washing system is selected from the group consisting of a ware washing system, a laundry washing system, a vehicle washing system, a clean in place washing system, and combinations thereof.

In some embodiments, the in situ cleaning system and methods of the invention can be applied at the point of use. That is, a method, system, or apparatus of the invention can be applied to a water source upstream of an application such as a washing system. In some embodiments, the water is passed through the one or more cleaning components immediately prior to the desired end use of the water source. For example, an apparatus of the invention could be employed to a water line connected to a household or restaurant appliance, e.g., a dishwashing or ware washing machine. In addition, the in situ cleaning system employing the methods of the present invention may be located in a washing system.

An apparatus or system according to embodiments of the invention may be used with a washing system in a variety of ways. In some embodiments, the apparatus or system may be connected to a detergent dispensing device. The apparatus or system may be used to supply water to a washing system. In some embodiments, the apparatus or system may be used to supply a mixture of water and an additional ingredient, e.g., surfactant, to a washing system.

All publications and patent applications in this specification are indicative of the level of ordinary skill in the art to which this invention pertains. All publications and patent applications are herein incorporated by reference in its entirety to the same extent as if each individual publication or patent application was specifically and individually indicated by reference, including, without limitation, the specification, claims, abstract, as well as any figures, tables, or drawings thereof.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Water Treatment Component Tested in Warewashing Process.

A warewashing test was completed on drinking glasses using a tank comprising a conversion agent (magnesium oxide and no calcite). A Hobart AM-14 automatic warewashing machine was used with a 17 Grain water source. The magnesium oxide treated water was supplied before the sump in the machine, thereby also having an effect during the rinse cycle. No detergent or rinse aid was applied to the glasses. As a control, a glass was washed for 100 cycles with untreated water. After 100 cycles the glasses were evaluated for spotting and filming, demonstrating that the glassware treated with water and a conversion agent had no filming or scaling, unlike the control glass which had substantial filming and spotting.

A conversion agent was also tested in a warewashing process using detergent formulations with and without a chelant or sequestrant. A water treatment system comprising a solid source of a conversion agent was attached to an automatic ware washing system. The conversion agent used in the study comprised magnesium oxide. The same water source and warewashing machine were utilized. Two detergent formulations were tested. The first comprised about 1000 ppm of a commercially available detergent with about 35% chelant, Apex Power®, available from Ecolab Inc. A rinse aid was applied after the glasses were washed with this detergent. The second detergent was free of a chelant or sequestering agent, and comprised about 32% NaOH, about 35% RU silicate (a sodium silicate available from Philadelphia Quartz), about 0.6% polyether siloxane, about 2% Plurionic N3® (a copolymer available from BASF), about 1% of a nonionic defoaming agent, about 9.5% soda ash, about 12% sodium sulfate, and about 1% water. About 650 ppm of the chelant free detergent was used. No rinse aid was used with the chelant-free detergent. The glasses were washed with either formulation for 100 cycles.

The glasses washed with the chelant free detergent were washed using water treated with a conversion agent of the present invention, i.e., magnesium oxide. The glasses washed with the commercially available detergent comprising a builder, i.e., Apex Power®, were washed using untreated water. Glassware washed using a chelant-free detergent and treated water, had substantially less filming and spotting than the glasses washed with Apex Power® and a rinse aid, but with untreated water. Further, it was observed that after the 100 cycles were completed, the inside of the machine used with the chelant free detergent and the treated water visually looked better than the machine used with the Apex Power® and the untreated water.

The test was repeated, adding a rinse aid after the wash cycle. About 2.33 mL of the rinse aid was added per cycle. The results demonstrated that when a rinse aid was added, both glasses had an improved visual appearance. However, the glass treated with the chelant-free detergent, and the treated water, still had substantially less spotting and filming than the glass washed with untreated water, and Apex Power®.

The same test was performed, this time using soiled glassware. Glasses were soiled with 100% whole milk and a dried protein/starch/grease combined soil. Soiled glasses were washed for 10 cycles, as described above, with either Apex Power®, or the chelant free detergent composition described above. The glasses were re-soiled between each cleaning cycle with additional starch and protein soil. The glasses washed with Apex® were washed with untreated water, and the glasses washed with the chelant-free detergent were washed with water treated with a conversion agent, i.e., magnesium oxide. The glasses washed with the chelant-free detergent and the treated water had less spotting and filming than those washed using Apex Power®. It was also observed that the glasses washed with Apex Power® and untreated water had a slightly bluish tint, and those washed with the treated water had no visual blue spotting.

Example 2

Water Treatment Components Tested on Ware Wash Systems.

A magnesium form of a weak acid cation exchange resin was produced: a weak acid cation resin, Lewatit S 8528 obtained from the Lanxess Company, was soaked is 500 grams of NaOH beads and 2500 ml of softened water for 24 hours. The pH was approximately 12-13. After soaking, the resin was then rinsed thoroughly with softened water three times until the pH of the rinse water was below 11. The resin was soaked in 2500 ml of softened water with 700 grams of MgCl2.6H2O for 4 days. The resin was thoroughly rinsed with softened water three times. The final pH of the rinse water was approximately 7.5-8.5.

Alternatively, the following process can be used to produce a magnesium form of a weak acid cation exchange resin: Lewatit S 8528 resin was soaked in a 60% magnesium hydroxide slurry for 4 days. The final pH of the rinse water was 11.0.

Two pounds of the magnesium treated resin was used to treat 17 gpg (grain per gallon) hard water. The two pounds of resin was placed into a flow-through reservoir and connected to the inlet of an institutional dishwashing machine. Treated water was used to wash test glasses in an AM-14 automatic ware washing machine with no detergent and no rinse-aid. After 1100 cycles using the same water treatment reservoir and resin, the interior of the ware washing machine showed no visible scale.

Test glasses were washed in a dish machine using hard water treated with the magnesium catalyst resin. A portion of the glasses were removed from the dish machine after 100, 600, 800 and 900 consecutive cycles of the magnesium treated resin and wash cycles of the glass. No scale buildup existed on the glass even after 600 wash/rinse cycles while using the magnesium treated resin. Even after 900 cycles, there was no scale buildup, indicating that the magnesium resin continued to reduce water harness even after 900 cycles.

Magnesium treated resin was also used to treat 17 Grain water using a flow-through reservoir connected to a hard water tap. The water was run through the reservoir to the drain and thus treated continuously for over 15,000 gallons. After treating 15,803 gallons of water, the reservoir was connected to an automatic ware washing machine (Type AM-14) for 800 cycles with no detergent or rinse aids. Following the 800 cycles, the interior of the ware washing machine demonstrated no visible scale. As a comparison, untreated 17 Grain water was run through a ware washing machine (type AM-14) for 800 cycles with no detergent or rinse aids. The interior of the ware washing machine showed heavy scale. This indicates that the resin bound magnesium continued to significantly reduce the soluble hardness in the water even after treating 15,803 gallons of water.

Example 3

Water Treatment Components Tested on Ware Wash Systems.

Magnesium treated resin, produced according to the method of Example 2, was used to treat 17 Grain water. The treated water was used in an automatic ware washing machine with a detergent to wash test glasses. The detergent was formulated with and without builder according to Table 1:

TABLE 1

| Raw Material | Detergent with builder (Approx. Wt. %) | Detergent without builder (Approx. Wt. %) |
|---|---|---|
| Alkalinity Source | 10% | 10% |
| Builders | 14% | 0.0% |
| Surfactants | 4% | 4% |
| Soda Ash | 67% | 81% |
| Solvent | 2% | 2% |
| Bleaching Agent | 3% | 3% |
| | 100.0% | 100% |

Glasses washed with the detergent without builder and without water treatment showed heavy scale. In comparison, glasses washed with the same detergent without builder and with water treated with magnesium bound resin, produced according to the method of Example 2, had less scale and looked better than the glasses washed in the untreated water. The results indicate that the use of the magnesium bound resin catalyst reduced the need for builder in the detergent, even in 17 Grain water.

Example 4

Water Treatment Components Tested in Warewashing and/or Rinsing.

The water treatment component of a water soluble magnesium source demonstrated reduced scale formation from unsoftened (hard water) sources. Surprisingly, adding a hardness ion ($Mg^{2+}$) to rinse water reduced formation of scale from hard water on glasses after warewashing. A first glass and a second glass were repeatedly washed (100 cycles) with a ware wash detergent (1000 ppm). A first glass was washed with a ware wash detergent containing magnesium chloride in 17 gpg water and rinsed with water of 17 grain hardness (corresponding to about 300 ppm Ca calculated as CaCO3 and about 100 ppm Mg calculated as CaCO3). The second glass was washed with a ware wash detergent containing magnesium chloride in 5 gpg water hardness and rinsed with water of 5 gpg hardness also containing about 48 ppm magnesium ion. The rinse water did not contain any additive (e.g., rinse aid) beyond magnesium compound. After washing with ware wash detergent, rinsing, and drying, the two glasses exhibited comparable clarity, despite the fact that washing in 17 gpg hard water followed by rinsing with water would normally be expected to yield glassware with more spotting than in softer water. The washing with a detergent containing magnesium chloride and/or rinsing with water containing magnesium ion reduced or eliminated the cloudiness typically observed when using hard water. Low levels of magnesium ions were effective in reducing scale build-up at various levels of water hardness.

Example 5

Alkalinity Generating Components—Decomposition Agents:

Various potential decomposition agents were tested for an increase in pH by hydrogen peroxide decomposition. Aqueous solutions were prepared including 5% hydrogen peroxide having an initial pH of 10, and 100 ppm of various decomposition agents. The pH of the solutions was monitored for 20 minutes at ambient temperature with very few materials resulting in a pH increase as during the course of their catalytic decomposition of hydrogen peroxide. Silver sulfate produced an increase in pH comparable to that obtained with a manganese-containing compound commercially available as "Dragons Blood"/Dragon A350 (manganese) from Rahu Catalytics. Silver sulfate also produced one of the fastest rates of pH increase via hydrogen peroxide decomposition compared to the various potential catalysts evaluated for alkalinity generation.

In addition to monitoring the pH of the solutions, the solutions were also observed for the presence of bubbling. The results on the observations is shown in the table below.

|  |  | no pH increase | pH increase |
|---|---|---|---|
| no bubbles | Sodium chloride<br>magnesium chloride<br>magnesium acetate<br>magnesium citrate<br>magnesium gluconate<br>sodium phosphomolybdate chloride<br>magnesium molybdate<br>magnesium gluconate<br>sodium molybdate<br>copper(II) acetate<br>copper(II) sulfate<br>copper(II) hydroxide<br>copper(II) chloride | titanium(II) oxide<br>zinc acetate<br>scandium acetate<br>Peractive MOR<br>Peractive LAC<br>vanadium (II) |  |
| bubbles | manganese(II) oxide<br>manganese(II) carbonate<br>manganese(II) sulfate chloride<br>manganese(II) acetate<br>iron(II) sulfate<br>iron(II) oxide<br>iron(III) oxide<br>iron(III) citrate<br>iron(III) gluconate | sodium hydroxide<br>cobalt(III) hydroxide<br>vanadium(III)<br>sodium molybdate<br>Stainless Amine(Fe II)<br>silver(I) oxide<br>silver(I) zeolite<br>silver | Vanadium(II) sulfate<br>Silver(I) sulfate<br>Dragon A350(Mn IV)<br>manganese(II,IV) oxide |

While many of the tested decomposition agents caused hydrogen peroxide to decompose under alkaline conditions as evidenced by bubbling, very few decomposition agents produced an increase in alkalinity.

The results diverge from the appreciated use of metallic catalysts in the preparation of rocket propellant sources from highly concentrated hydrogen peroxide ($H_2O_2$ often in excess of 70%, 90% and 98%). See e.g., U.S. Pat. Nos. 6,991,772 and 6,887,821. According to the invention a dilute peroxygen source can be decomposed to generated alkalinity in situ from a reduced alkalinity detergent in combination with an alkalinity generating decomposition agent. The results further diverge from use of catalysts to enhance bleaching activity of a detergent, as the decomposition agents are utilized to cause the peroxygen source to actually decompose to generate the alkalinity rather than enhance bleaching of the peroxygen source.

Example 6

Alkalinity Generating Components—Decomposition Agents in Support Medium:

A gravity-fed column was prepared having a silver sulfate decomposition agent on a magnesium oxide support as follows. A 200 g bed of 2% silver sulfate powder was physically admixed with 98% granular magnesium oxide and placed in a column. The column was then flushed with a large volume of water until the effluent ran clear. The material remaining in the bed was analyzed and showed the silver sulfate to have stabilized at about 0.2% remaining in the bed with physical loss of the remainder. Solutions having various concentrations of hydrogen peroxide, from 1000 ppm to 2.5% hydrogen peroxide, were then run through the column in 200 mL aliquots. The time required for a gravity feed of 200 mL liquid through the bed was approximately 1 minute. The pH of the solutions was monitored for 20 minutes.

Each solution produced a pH of 10-11 from the hydrogen peroxide without any added alkalinity outside of the "captive" alkalinity of the magnesium oxide bed. The effluent from the 1000 ppm peroxide sample was analyzed and showed less than 30 ppm with 200 ppm hydrogen peroxide remaining. It is hypothesized that when the alkalinity and the amount of silver sulfate are greatly increased, the hydrogen peroxide needed to generate a given alkalinity is substantially decreased, improving the system's cost effectiveness.

Samples of the effluent from the 1% hydrogen peroxide solution were placed onto polymerized corn oil and a paper towel was placed onto the effluent. The effluent and paper towel were left to stand for 10 minutes. When the paper towel was removed, the wetted area of the paper towel afforded complete removal of the soil. This result demonstrates the utility of the solution as a potential oven and/or grill cleaner and food processing area cleaner.

Additional gravity-fed decomposition agent cartridge was prepared using Dragon A350 as follows. A 200 g bed was prepared by adsorbing 2% Dragon A350 onto a 98% granular magnesium bed in a glass column. Magnesium oxide, which has a water solubility of 6 ppm, was selected as the bed based on the promoter study and its ability to have a very mild bulk pH of 8-9 while having a captive localized pH of 12-13 at its surface. The column was then flushed with a large volume of water until the initially orange effluent ran colorless. Various concentrations of hydrogen peroxide were then run through the column in 200 mL aliquots, starting at 1000 ppm hydrogen peroxide and increasing up to a final feed of 2.5% hydrogen peroxide. The time required for the gravity feed of 200 mL liquid through the bed was approximately 1 minute. Each concentration of hydrogen peroxide consistently gave a pH of 10-11 from the hydrogen peroxide, without any added alkalinity required outside the captive alkalinity of the magnesium oxide bed.

Samples of effluent from the 1% hydrogen peroxide run were placed onto polymerized corn oil and a paper towel was placed onto the effluent. The effluent and paper towel were left to stand for 10 minutes. When the paper towel was removed, the wetted area of the paper towel afforded complete removal of the soil, demonstrating utility as a cleaner such as an oven cleaner, a grill cleaner, or a food processing area cleaner.

Example 7

Water Treatment Component—Electrolytic Conversion of Sodium Carbonate to Sodium Hydroxide:

A Micro Flow electrochemical cell from ElectroCell AB (Sweden) was set-up as a two compartment cell with a 316 stainless steel anode and a titanium cathode. DuPont's Nafion 424 cation exchange membrane was placed between the anodic and cathodic chambers. A saturated solution of sodium carbonate was circulated through the anodic chamber and 17 grain hardness water circulated through the cathodic chamber. The cell was operated at 5 amps for 3 hours, generating sodium hydroxide. At the end of the test period, the cell was disassembled and examined. A heavy white scale covered the cathode nearly completely, reducing its efficiency.

The same Micro Flow electrochemical cell with cation exchange membrane was set-up as described above. A saturated solution of sodium carbonate was circulated through the anodic chamber and 17 grain hardness water containing 300 ppm Acumer 1000 threshold agent (commercially-available from Rohm & Haas) was circulated through the cathodic chamber. The cell was operated at 5 amps for 3 hours, generating sodium hydroxide. At the end of the test period, the cell was disassembled and examined. No visible scale was noted, maintaining the cell's efficiency for the production of sodium hydroxide.

Example 8

Figure 8:
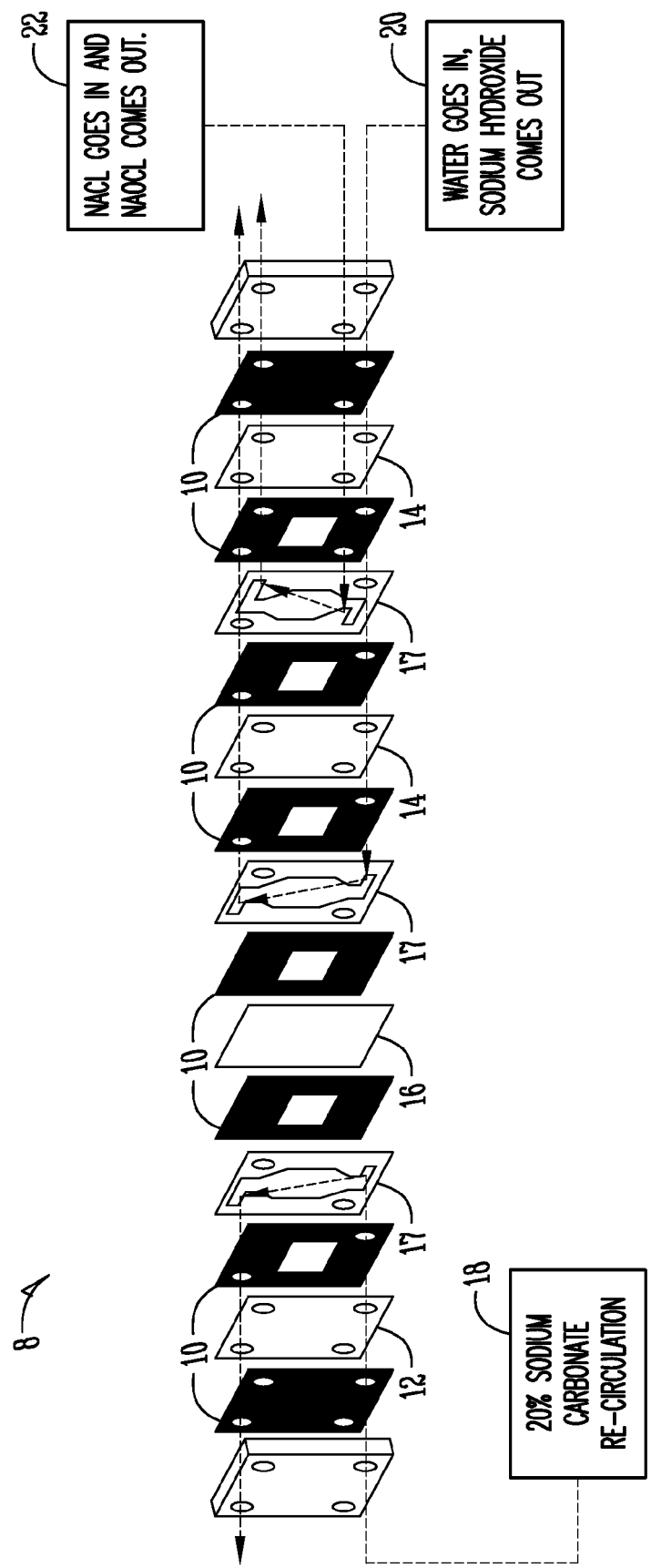
FIG. 8 is a schematic diagram of a water treatment component for independent production of streams of sodium hypochlorite and sodium hydroxide using shared electrodes according to a non-limiting embodiment of the in situ cleaning system.

Water Treatment Component—Production of Independent Streams of Sodium Hypochlorite and Sodium Hydroxide Using Shared Electrode:

As shown in FIG. 8, a Micro Flow electrochemical cell was set-up as a two-chambered cell 8 for the conversion of sodium carbonate to sodium hydroxide, using rubber gaskets 10, a 316 stainless steel anode 12 and a ruthenium oxide-coated cathode 14 with a Nafion 424 cation exchange membrane 16 separating the two chambers. The outside surface of the anode for the carbonate-to-hydroxide cell also served as in conjunction with an additional ruthenium oxide-coated plate as a one compartment cell for the independent production of alkaline sodium hypochlorite from sodium chloride. Teflon flow directors 17 were utilized in the cell design.

A saturated solution of sodium carbonate 18 was circulated through the anodic chamber of the two compartment cell and soft water 20 through the cathodic chamber of the two compartment system. A solution of 4000 ppm sodium chloride in soft water 22 was circulated through the one compartment cell. Operating both cells at 5 amps, the pH of the water stream was raised from neutral up to 11.8 from the production of sodium hydroxide. The sodium chloride stream was converted into 690 ppm sodium hypochlorite with a pH of 9.6. When disassembled, no hard water scale build-up was noted on either cell. A benefit of this cell configuration is the ability to increase the alkalinity output of the cell without having to increase the hypochlorite output.

Example 9

Water Treatment Component—Hard Water Scaling During the Independent Production of Streams of Sodium Hypochlorite and Sodium Hydroxide Using Shared Electrode:

Hard water (17 grain) was substituted for the soft water 22 in Example 8 (shown in FIG. 8) for both the carbonate-to-hydroxide cell and also water used to make-up the sodium chloride solution for the hypochlorite cell. The unit was then operated for 3 hours followed by disassembly for examination. The ruthenium oxide-coated electrodes 14 for both cells in the unit were heavily coated with hard water scale, reducing their efficiency.

Example 10

Water Treatment Component—Effect of Threshold Agent on Hard Water Scaling During the Independent Production of Streams of Sodium Hypochlorite and Sodium Hydroxide Using Shared Electrode:

Example 9 was replicated but with 300 ppm Acumer 1000 added to the water feed and also to the sodium chloride feed. After 3 hours operation, inspection of the electrodes showed no visible build-up of hard water scale anywhere.

Example 11

Water Treatment Component—Independent Production of Streams of Sodium Hypochlorite and Sodium Hydroxide Using Separate Electrode Pairs:

As shown in FIG. 9, a Micro Flow electrochemical cell was set-up as a two chambered cell 8 for the conversion of sodium carbonate to sodium hydroxide, using rubber gaskets 10, a 316 stainless steel anode 12 and a titanium cathode 24 with a Nafion 424 cation exchange membrane separating the two chambers 16. Teflon flow directors 17 were utilized in the cell design. Separated from the carbonate-to-hydroxide cell by gasketing 10, a pair of ruthenium oxide-coated plates 14 were used as a one compartment cell for the independent production of alkaline sodium hypochlorite from sodium chloride.

A saturated solution of sodium carbonate 18 was circulated through the anodic chamber of the two compartment cell and soft water 20 through the cathodic chamber of the two compartment system 8. A solution of 4000 ppm sodium chloride in soft water 22 was circulated through the one compartment cell. Operating both cells at 5 amps, the pH of the water stream was raised from neutral up to 11.9 from the production of sodium hydroxide. The sodium chloride stream was converted into 620 ppm sodium hypochlorite with a pH of 9.3. When disassembled, no hard water scale build-up was noted on either cell. A benefit of this cell configuration is the ability to increase the alkalinity output of the cell without having to increase the hypochlorite output.

Example 12

Water Treatment Component—Effect of Hard Water on the Independent Production of Streams of Sodium Hypochlorite and Sodium Hydroxide Using Separate Electrode Pairs:

Example 11 was replicated substituting 17 grain hard water for the soft water in the carbonate-to-hydroxide cell and also for the water used to make-up the sodium chloride solution. After running the unit for 3 hours at 5 amps, the cells were disassembled for inspection. Heavy build-up of hard water scale was noted on the titanium cathode and also the ruthenium electrode, reducing cell efficiency.

Example 13

Water Treatment Component—Effect of Hard Water on the Independent Production of Streams of Sodium Hypochlorite and Sodium Hydroxide Using Separate Electrode Pairs:

Example 12 was replicated with 300 ppm Acumer 1000 added to the 17 grain hard water in the carbonate-to-hydroxide cell and also to the sodium chloride solution of the hypochlorite cell. After running the unit for 3 hours at 5 amps, the cells were disassembled for inspection. No visual evidence of hard water scale build-up was noted.

Example 14

Water Treatment Component—Serial Operation of Independent Production of Hydroxide and Hypochlorite:

Example 8 was replicated except that the output of the hypochlorite cell was substituted for the water feed into the carbonate-to-hydroxide cell. Output from the hydroxide cell was pH 11.9 and 590 ppm hypochlorite. The output of the carbonate-to-hydroxide cell was combined with an equal volume of 8000 ppm sodium chloride to prepare the chloride feed for the hypochlorite cell. Output from the hypochlorite cell was pH 11.9 and 310 ppm hypochlorite.

What is claimed is:

1. An in situ cleaning system comprising:
   (a) an inlet capable of providing feed water to an in situ cleaning component;
   (b) an in situ cleaning component comprising one or more of:
      (i) a water treatment component;
      (ii) an oxidizing agent generating component; and
      (iii) an alkalinity generating component, wherein the alkalinity generating component comprises a decomposition agent selected from the group consisting of a source of manganese, a source of silver, and combinations thereof, wherein the decomposition agent catalyzes a decomposition of an oxidizing agent to form a source of alkalinity when contacted with the oxidizing agent; and
   (c) an outlet in fluid communication with a washing system.

2. The system of claim 1, wherein the one or more in situ cleaning components are provided in a single housing.

3. The system of claim 1, wherein the one or more in situ cleaning components are provided in a plurality of housings.

4. The system of chum 1, wherein the cleaning system is positioned external to the washing system.

5. The system of claim 1, wherein the cleaning system is positioned internally to the washing system.

6. The system of claim 1, wherein the water treatment component is capable of reducing a source of solubilized water hardness in the feed water.

7. The system of claim 1, wherein the water treatment component comprises a threshold agent.

8. The system of claim 1, wherein the water treatment component is a treatment reservoir comprising one or more conversion agents selected from the group of meta oxides, metal hydroxides, and mixtures thereof.

9. The system of claim 8, wherein at least one of the one or more conversion agents is a solid and is agitated in a bed of the treatment reservoir by a method selected from the group consisting of the flow of water through the column, fluidization, mechanical agitation, high flow backwash, recirculation, and combinations thereof.

10. The system of claim 1, wherein the water treatment component comprises one or more catalysts positioned inside a treatment reservoir and is selected from the group consisting of a source of magnesium, aluminum, zinc, and titanium ions and is bound to a supporting material.

11. The system of claim 10, wherein the supporting material comprises a weak acid cation resin selected from the group consisting of an acrylic acid polymer, a methacrylic acid polymer, and mixtures there.

12. The system of claim, wherein the water treatment component comprises a removable cartridge.

13. The system of claim 1, wherein the water treatment component comprises an alkaline source to increase the pH of the water source to greater than about 9.

14. The system of claim 1, wherein the water treatment component includes an inlet for providing a water soluble source of magnesium to the feed water.

15. The system of claim 1, wherein the oxidizing agent generating component comprises an electrochemical unit capable of producing an oxidizing agent selected from the group consisting of hydrogen peroxide, ozone, a peracid, a halogen bleach, and mixtures thereof and further comprises a bypass line fluidly connected between the oxidizing agent generating component and the washing system.

16. The system of claim 15, wherein the electrochemical unit further provides a source of alkalinity.

17. The system of claim 1, wherein the decomposition agent is provided on a support medium comprising an inert support bed having low water solubility and is selected from the group consisting of magnesium oxide, magnesium hydroxide, zinc oxide, titanium oxide, silicon oxide, aluminum silicate, ceramic, carbon, polymeric material and combinations thereof.

18. The system of claim 1, wherein the decomposition agent is provided on a support medium comprising a fabric selected from the group consisting of a sponge, a non-woven material, a woven material, an extruded film, a laminate, and combinations thereof.

19. The system of claim 1, wherein the alkalinity generating component comprises an electrochemical unit capable of producing a source of alkalinity, and an inlet in fluid communication with the electrochemical cell, wherein the inlet provides a source of alkali metal carbonate, bicarbonate, and mixtures thereof to the electrochemical cell.

20. The system of claim 1, further comprising an additional ingredient inlet in fluid communication with the outlet, wherein the additional ingredient inlet is capable of providing an additional ingredient to the washing system and consists essentially of a surfactant and/or is substantially free of a source of alkalinity and/or a builder.

* * * * *

UNITED STATES PATENT AND TRADEMARK OFFICE
CERTIFICATE OF CORRECTION

PATENT NO. : 8,459,275 B2  
APPLICATION NO. : 12/887755  
DATED : June 11, 2013  
INVENTOR(S) : Kim R. Smith et al.

Page 1 of 1

It is certified that error appears in the above-identified patent and that said Letters Patent is hereby corrected as shown below:

In the Claims

<u>Col. 30, Claim 4, Line 17:</u>  
DELETE after of "chum"  
ADD after of --claim--

<u>Col. 30, Claim 8, Line 28:</u>  
DELETE after of "meta"  
ADD after of --metal--

Signed and Sealed this  
Twenty-third Day of July, 2013

Teresa Stanek Rea  
*Acting Director of the United States Patent and Trademark Office*